(12) United States Patent
Agerstam et al.

(10) Patent No.: US 11,246,094 B2
(45) Date of Patent: Feb. 8, 2022

(54) MECHANISM FOR EFFICIENT DATA REPORTING IN IIOT WSN

(71) Applicant: Intel Corporation, Santa Clara, CA (US)

(72) Inventors: Mats Agerstam, Portland, OR (US); Vijay Sarathi Kesavan, Portland, OR (US); Douglas K Hudson, Beaverton, OR (US); Thuyen C Tran, Hillsboro, OR (US); Shilpa A Sodani, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 252 days.

(21) Appl. No.: 16/461,724

(22) PCT Filed: Dec. 30, 2016

(86) PCT No.: PCT/US2016/069590
§ 371 (c)(1),
(2) Date: May 16, 2019

(87) PCT Pub. No.: WO2018/125233
PCT Pub. Date: Jul. 5, 2018

(65) Prior Publication Data
US 2019/0364502 A1  Nov. 28, 2019

(51) Int. Cl.
*H04W 52/02* (2009.01)
*H04W 4/38* (2018.01)
(Continued)

(52) U.S. Cl.
CPC ......... *H04W 52/0229* (2013.01); *H04W 4/12* (2013.01); *H04W 4/38* (2018.02); *H04W 52/0216* (2013.01); *H04W 84/18* (2013.01)

(58) Field of Classification Search
CPC ..... H04W 4/12; H04W 4/38; H04W 52/0229; H04W 4/80; H04W 52/0216; H04W 84/18; H04L 29/08; Y02D 30/70
See application file for complete search history.

(56) References Cited

U.S. PATENT DOCUMENTS

2007/0201413 A1  8/2007  Laine et al.
2008/0253327 A1  10/2008  Kohvakka et al.
(Continued)

FOREIGN PATENT DOCUMENTS

| CN | 104869622 | 8/2015 |
| CN | 110050455 | 7/2019 |
| WO | WO-2018125233 | 7/2018 |

OTHER PUBLICATIONS

"International Application Serial No. PCT/US2016/069590, International Search Report dated Sep. 20, 2017", 3 pgs.
(Continued)

*Primary Examiner* — Oussama Roudani
(74) *Attorney, Agent, or Firm* — Schwegman Lundberg & Woessner, P.A.

(57) ABSTRACT

A wireless sensor network is provided comprising: a node that listens for radio messages with periodic control messages, and listens for radio messages with periodic sensor data messages, and determines whether to skip listening for radio messages with a periodic sensor data message during a sensor data time period based upon a skip indicator included in a periodic control message.

23 Claims, 11 Drawing Sheets

(51) Int. Cl.
*H04W 4/12* (2009.01)
*H04W 84/18* (2009.01)

(56) References Cited

U.S. PATENT DOCUMENTS

| | | | |
|---|---|---|---|
| 2009/0022078 A1* | 1/2009 | Patterson | G01D 21/00 370/311 |
| 2009/0316679 A1 | 12/2009 | Van Der Wateren | |
| 2013/0039350 A1* | 2/2013 | Bhatia | H04W 48/12 370/336 |
| 2013/0058318 A1* | 3/2013 | Bhatia | H04W 56/001 370/337 |
| 2014/0301261 A1* | 10/2014 | Godor | H04W 52/0241 370/311 |
| 2015/0063325 A1* | 3/2015 | Elliott | H04W 56/00 370/336 |
| 2016/0014690 A1 | 1/2016 | Xhafa et al. | |
| 2016/0021017 A1 | 1/2016 | Thubert | |
| 2016/0330689 A1 | 11/2016 | Park et al. | |

OTHER PUBLICATIONS

"International Application Serial No. PCT/US2016/069590, Written Opinion dated Sep. 20, 2017", 6 pgs.

Quazi, Mamun, "A Qualitative Comparison of Different Logical Topologies for Wireless Sensor Networks", MDPI AG vol. 12 Issue 11, (Nov. 5, 2012), 14887-14913.

"International Application Serial No. PCT US2016 069590, International Preliminary Report on Patentability dated Jul. 11, 2019", 8 pgs.

"European Application Serial No. 16924961.2, Extended European Search Report dated May 27, 2020", 8 pgs.

"Chinese Application Serial No. 201680091366.1, Office Action dated Aug. 31, 2021", With English translation, 27 pgs.

* cited by examiner

```
                                      ┌─ 880
882 ─┐
┌─────────────────────────┐
│ Receive sensor data messages │
│ from multiple nodes during   │
│ their allocated sensor data time │
└─────────────────────────┘
            │
884 ─┐      ▼
┌─────────────────────────┐
│ Store sensor data from received │
│ sensor data messages in        │
│ storage device together with a │
│ record of time of receipt of   │
│ the data messages              │
└─────────────────────────┘
            │
886 ─┐      ▼
┌─────────────────────────┐
│ Track time elapsed since time │
│ of receipt of data for each   │
│ sensor data message           │
└─────────────────────────┘
            │
888 ─┐      ▼
       ◇ Has
     elapsed time since       Yes
   receipt reached a threshold ──────┐
    delay for any currently          │
       stored data                   │
            ?                        │
           No                        │
            │                        │
890 ─┐      ▼                        ▼
       ◇ Has                 ┌──────────────────┐  ─ 892
    remaining storage device  │ Send all currently stored data │
    capacity reached a   Yes  │ to next hop                    │
      storage threshold ─────▶└──────────────────┘
            ?                        │
           No                        ▼            ─ 894
                             ┌──────────────────┐
                             │ Flush stored sensor data │
                             │ from storage device      │
                             └──────────────────┘
```

MECHANISM FOR EFFICIENT DATA REPORTING IN IIOT WSN

PRIORITY APPLICATION

This patent application is a U.S. National Stage Application under 35 U.S.C. 371 from International Application No. PCT/US2016/069590, filed Dec. 30, 2016, published as WO 2018/125233, which is incorporated herein by reference in its entirety.

BACKGROUND

There is an explosive growth projected in the Industrial Internet of Things (IIoT) and one subcategory of IIoT deployments is Wireless Sensor Networks (WSN). A WSN contains spatially distributed autonomous sensors to monitor physical or environmental conditions, such as temperature, sound, pressure, motion, or pollution that are wirelessly coupled cooperatively pass sensor data through the network to a main location, referred to as gateway (GW) or coordinator. A WSN is built of "nodes"—from a few to several hundreds or even thousands, where each node is connected to sensor(s). In addition to sensor(s) each node includes radio transceiver(s), a microcontroller, and a power source. The topology of an WSN may vary from a simple star network to an advanced multi-hop wireless mesh network. The propagation technique between the hops of the network may be routing or flooding. WSNs are used in numerous sectors and their applications include area monitoring (e.g., geo-fencing, oil pipelines); environmental sensing (e.g., air pollution, water quality); industrial monitoring (e.g., machine health, data centers), and data logging. Often, WSN nodes are size and cost constrained resulting in constrained energy, memory, computation, and communication bandwidth. Coin cell batteries or energy harvesting are common techniques to power WSN nodes.

BRIEF DESCRIPTION OF THE DRAWINGS

FIG. 9 is an illustrative process flow diagram indicating configuration of a parent node to aggregate sensor data, according to some embodiments.

DESCRIPTION OF EMBODIMENTS

Figure 1:
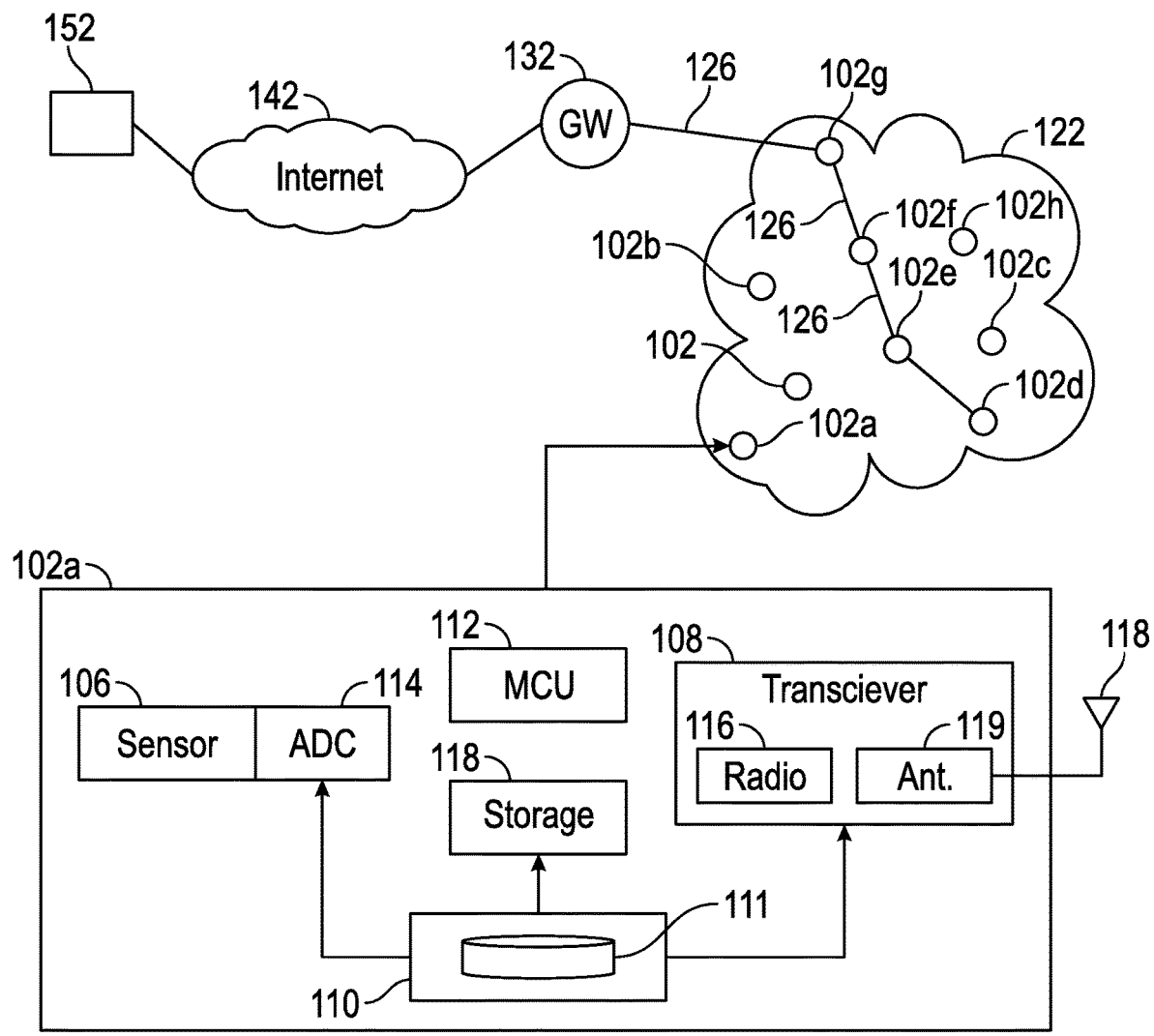
FIG. 1 is an illustrative block diagram representing a sensor node, a Wireless Sensor Networks (WSN) containing the node, and a gateway coupling of the WSN to the Internet, according to some embodiments.

FIG. 1 is an illustrative block diagram representing details of a sensor node 102a of a WSN 122 containing the node 102a and a gateway (GW) node 132 coupling the WSN 122 to the Internet 142 a user device 152 coupled to access sensor data from nodes of the WSN 122. The sensor node 102a includes a sensor 106, a wireless transceiver 108, a power source 110, and a microcontroller unit (MCU) 112. The sensor 160 is coupled to analogue to a digital converter (ADC) 114. The ADC 114 converts analogue signals produced by the sensor 106 to digital signals and then provides the digital signals to the MCU 112. The wireless transceiver includes a short range radio 116 and an antenna 118 used to transmit messages to and receive messages from neighbor nodes. The power source 110 includes a battery 111 that powers the other components. The MCU 112 is coupled to a storage device 118 that may cache data received by the node 102a that is in transit from a prior hop to a next hop in the WSN 122. The MCU 112 manages operation of the sensor 106 and the transceiver 108 and the power source 110. The MCU 112 is programmed to manage data collection from sensor 106, to interface sensor data to the transceiver 108, to manage radio network communication protocols used to communicate with other sensors in the WSN 122, and to manage power consumption.

Figure 2:
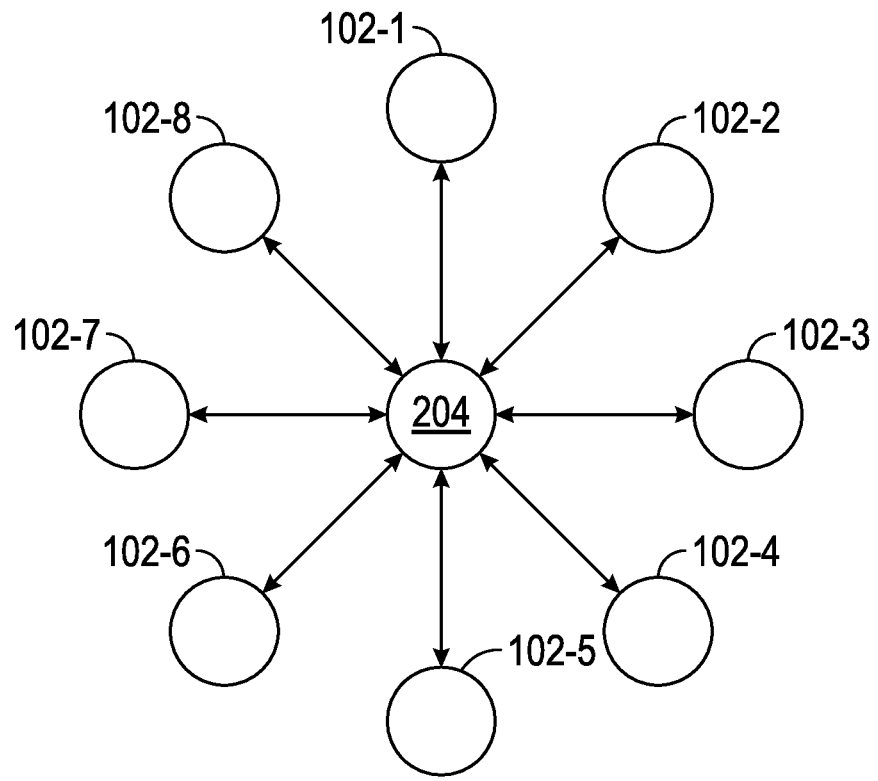
FIG. 2 is an illustrative drawing representing a star network topology.
Figure 3:
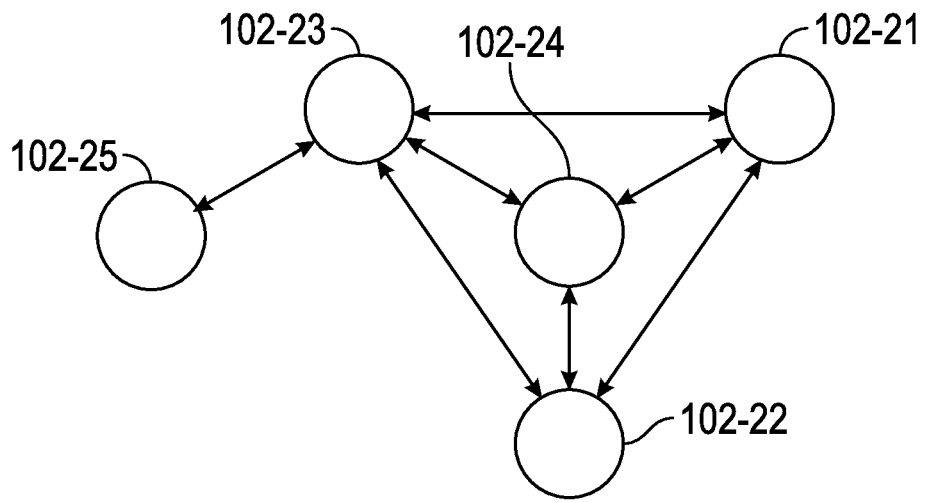
FIG. 3 is an illustrative drawing representing a mesh network topology.

The WSN 122 comprises a plurality of instances of a node 102a-102g. A message may be transmitted over a multi-hop path 126 from a source node 102d to 102g to the GW 132, which sends the message over the internet 142 to a user device monitoring the network. The nodes of the WSN 122 are organized according to a network topology that determines rules for communication among nodes. FIG. 2 is an illustrative drawing showing an example a star network topology 200 in which a single gateway 204 may sand and/or receive a message from multiple instances of a node 102-1 to 102-8. The node instances 102-1 to 201-8 are not permitted to send messages to each other. FIG. 3 is an illustrative drawing showing an example mesh network topology 300, which permits each instance of a node 102-21 to 102-24 to transmit and receive data from any node that is within its radio transmission distance. A mesh network 300 allows for multi-hop communications in which a node such as node 102-21 may send a message to another node, such as to node 102-25 that is out of radio communications range through an intermediate node such as node 102-23 that forwards the message from the sending node 102-23 to the receiving node 102-25.

In some embodiments, one or more hops between nodes of the WSN 122 may involve communication over a wired connection, while other hops involve wireless communication. For example, in some embodiments, nodes 102e and 102f may communicate with each other over a wired connection and communicate with other nodes in the WSN 122 over wireless connections. In some embodiments, nodes that communicate with each other using wired connections use the same communication protocols on the wired connections that are used within the WSN 122 for wireless communications.

A primary role of the sensor node 102 within a mesh network is to sense data and send it to a GW node 132 over a multi hop WSN 122 in which it is a member node. A node's MCU 112 implements sensing and communication protocols to achieve this purpose in a power-efficient manner. To save power, the MCU 112 may cause the sensor 106 to sense data on a periodic basis. The MCU 112 may cause the transceiver 108 to operate under different power modes to reduce power consumption. In general, in order to save power, the MCU 112 completely shuts down the transceiver 108 rather than putting it in the Idle mode when it is neither transmitting nor receiving.

Thus, a role of the MCU 112 is to manage the sensor 106 and the transceiver 108 to utilizing WSN communication protocols while achieving efficient power consumption. Communication between sensor nodes and GW 132 typically occurs through standards-based WSN communication protocols such as IEEE 802.15.4, Bluetooth Low Energy (BLE), Wireless HART, for example, or through proprietary WSN communication protocols such as ANT. The focus of these protocols is to define interoperable control/data messages suitable for low power devices. Power management optimizations to the protocols generally are left to WSN application developers to leverage application-specific requirements/usages.

Figure 4:
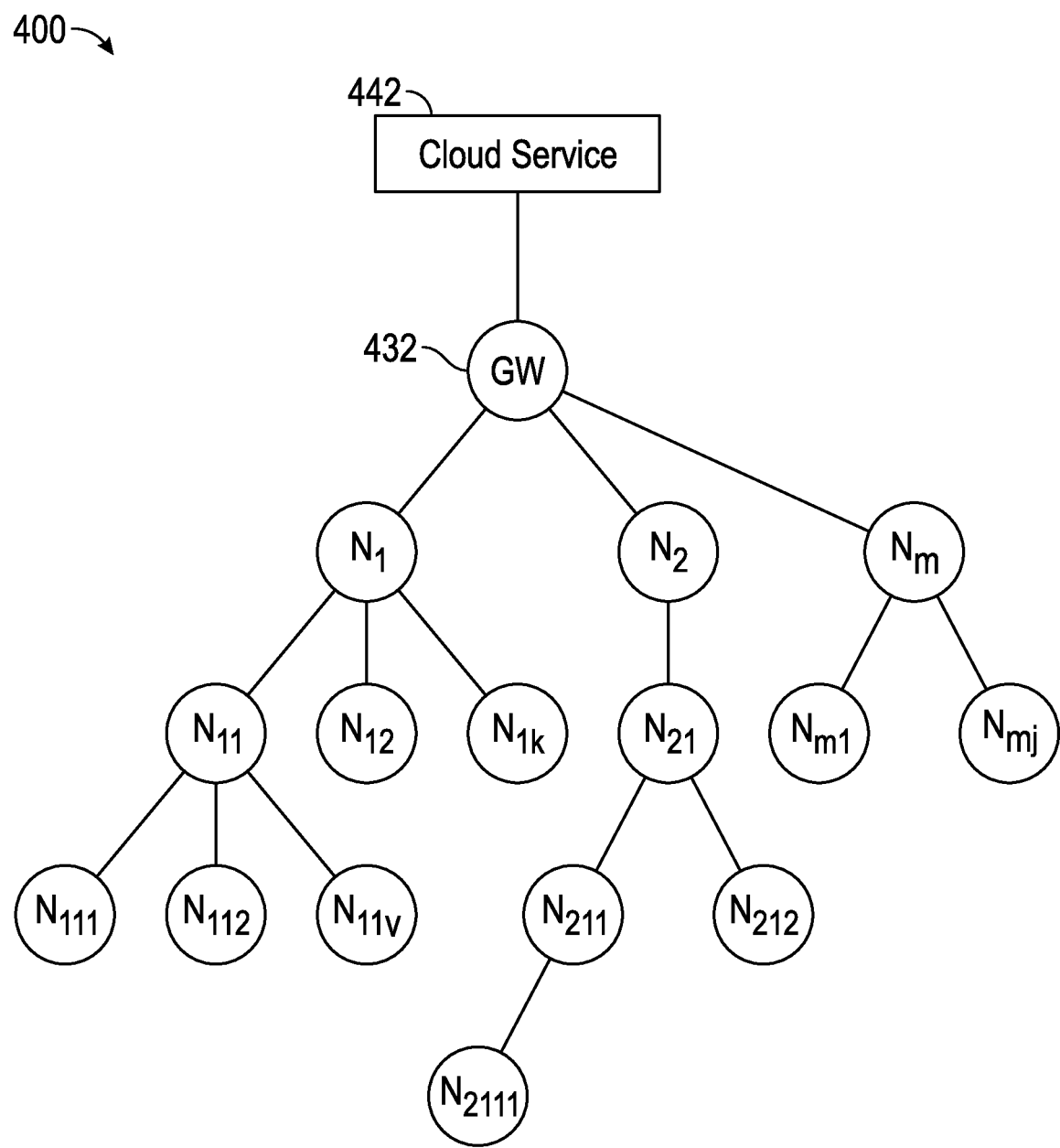
FIG. 4 is an illustrative drawing representing a WSN multi-hop mesh network, according to some embodiments.

FIG. 4 is an illustrative drawing representing a WSN multi-hop mesh network 400. The nodes of the mesh network may communicate using a WSN routing protocol such as RPL, for example, to establish hierarchical tree structure among them in which sensor data may be communicated 'up' through multiple hops from a sensor data source node to a GW node 432, which in turn, may communicate the sensor data over a network such as an internet cloud service 442. Each individual node may have a parent-child relationship with another node within its transceiver radio range. In such a tree structure, a parent node is aware of its children and manages the scheduling and reporting of data received from its child nodes. For example, node $N_1$ may have parent-child relationships with each of nodes $N_{11}$, $N_{12}$ and $N_{1k}$ in which $N_1$ is the parent and $N_{11}$, $N_{12}$ and $N_{1k}$ are the children. Similarly, Node $N_{21}$ may have a parent-child relationship with each of nodes $N_{211}$ and $N_{212}$ in which $N_{21}$ is the parent and $N_{211}$ and $N_{212}$ are the children.

A time slotted channel hopping (TSCH) scheduling protocol may be used to schedule transmission of messages between nodes in the mesh network 400. Each node is scheduled to periodically send control messages. Each node also is scheduled to periodically send sensor data messages. Control messages may include information for use in routing and maintaining time synchronization using enhanced beacons (EB), for example. The control messages may act as 'keep-alive' messages that provide an indication that the node sending the message remains alive and active in the WSN 400. An MCU 112 of a parent node that fails to receive a control message from a child node during one or more time slots allocated to the child node for the sending of a control message may conclude that the child node is no longer active and may remove it from a list of child nodes that it manages. The MCU 112 may then use a WSN routing protocol to seek a work-around path involving other nodes within the WSN 400 to replace the connectivity lost when the child node was removed. If a node is unable to schedule data and/or control messages in its schedule slots, it may use a CSMA mechanism for additional slots.

Figure 5:
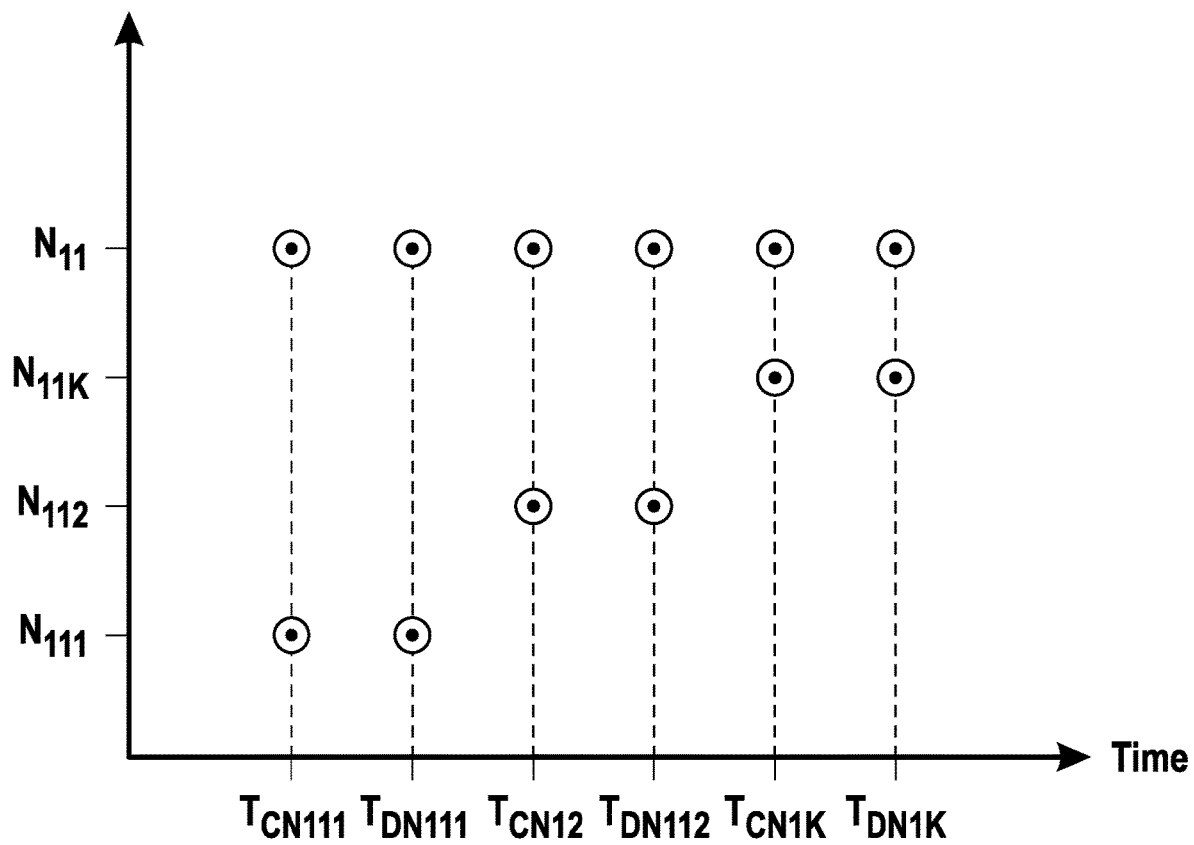
FIG. 5 is an illustrative time slotted channel hopping (TSCH) schedule showing example sending and receiving of control messages and sensor data messages by nodes within the network of FIG. 4, according to some embodiments.

FIG. 5 is an illustrative example of a time slotted channel hopping (TSCH) schedule for sending and receiving control messages and sensor data messages by certain example nodes within the network 400 of FIG. 4. The MCUs 112 of the nodes acting in a child role cause their respective transceivers 108 to send control messages and to send sensor data messages to their parent nodes during scheduled time slots. The MCUs 112 of the nodes acting in a parent role cause their respective transceiver 108 to listen for control messages and to listen for data messages from their child node(s) during scheduled time slots. While listening, the transceiver 108 is powered up and tuned to receive signals at one or more frequencies allocated to control and/or data signals. The example schedule in FIG. 5 shows that node $N_{111}$ in its role as a child node is scheduled to send a control message to its parent node $N_{11}$ during control time slot $T_{CN111}$ and is scheduled to send a sensor data message to its parent node $N_{11}$ during data time slot $T_{DN111}$. Conversely, node $N_{11}$ in its role as a parent node is scheduled to listen for a control message from its child node $N_{111}$ during control time slot $T_{CN111}$ and is scheduled to listen for a sensor data message during data time slot $T_{DN111}$. Example control message time slots and sensor data message time slots also are shown for nodes $N_{112}$ and $N_{11k}$.

The WSN 400 of FIG. 4 may use either a connectionless or connection-oriented reporting of sensor data. Table A describes aspects of connectionless and connection-oriented reporting of sensor data.

TABLE A

| | Traffic Flow Upwards | Traffic Flow Down-Up |
|---|---|---|
| Connectionless | Data is sent periodically by sensor nodes upon state change or preconfigured timers. Relay nodes repeat data towards the root or gateway node | Critical state changes in sensor nodes are reflected in periodic control traffic (beacons or similar). Root/GW initiates a connection to acquire the data. |
| Connection oriented | Sensor nodes perform connection requests to root or relay node to report the data. | Root/GW node initiates connection requests to target sensor node to acquire data. Can be combined with Connectionless/Down-Up flow for optimization. | a) Upwards or unsolicited sensor data reporting (periodic, non-critical and excursions, alarms) is communicated from source sensor node or a delegated parent upwards in the tree, ultimately to be received by the coordinator or gateway.

b) Down-up or on-demand sensor data reporting is communicated on-demand (directly or indirectly) from the coordinator. A request for the data is sent downwards the tree to the destination node, and the response is provided back directly from the source node or a delegated parent node that cached the data on behalf of the node.

Traffic Reduction by State Change Signaling in Control Messaging

A typical sensor node such as node 102a operating as a child node may not have new sensor data to report during every periodic sensor data message time slot allocated to it. For example, a sensor application may require reporting of sensor data with a periodicity that is much longer than the sensor data message time slot periodicity. Alternatively, a sensor application may require reporting of sensor data only upon the occurrence of some event such as a sensed pressure measurement, temperature measurement or vibration measurement reaching some threshold limit, or upon sensing of the opening of a door or window, for example.

Figure 6A:
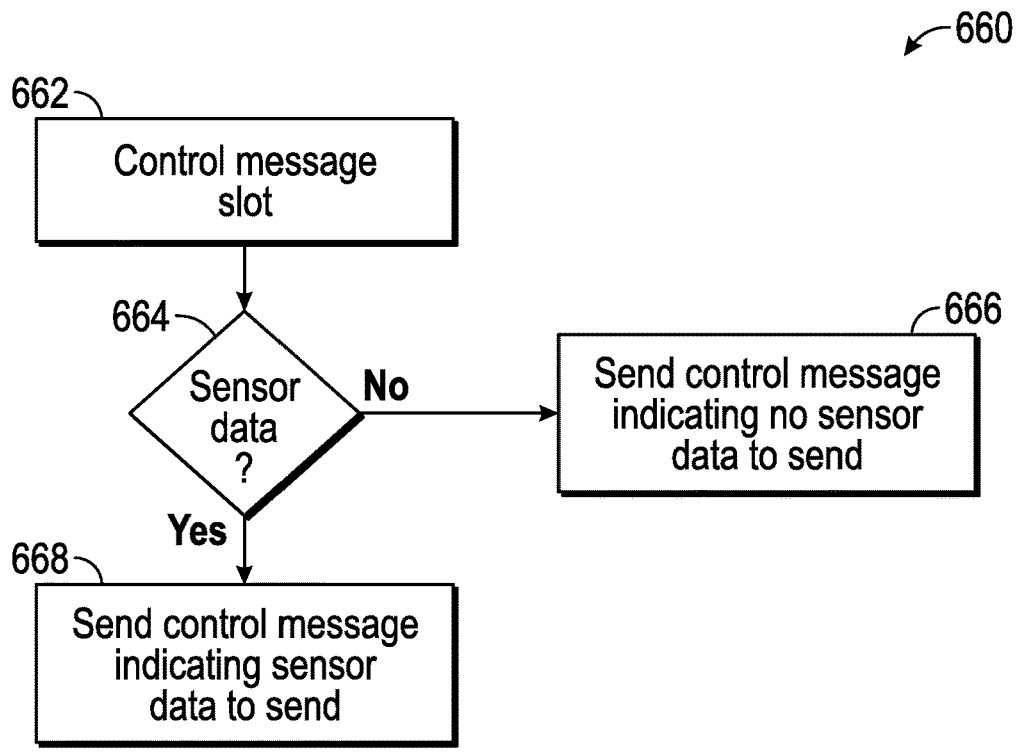
FIG. 6A is an illustrative process flow diagram indicating configuration of an MCU of a child node to determine and send a sensor data indicator in a child node control message to a parent node, according to some embodiments.

FIG. 6A is an illustrative process flow diagram 660 indicating configuration of an MCU 112 of a node such as node 102a operating as child node to determine and send a sensor data indicator a child node control message to a parent node. Block 662 identifies timing of a control message time slot interval allocated to the child node. Decision block 664 determines whether the sensor of the child node has produced new sensor data to be sent to a parent node in a next sensor data message time slot allocated to the child device. In response to a determination that no sensor data is to be sent to a parent node in a next sensor data message time slot allocated to the child node, block 666 includes in a control message to the parent an indication that no sensor data will be sent in a next sensor data message time slot. In response to a determination that sensor data is to be sent to a parent (next hop) in a next sensor data message time slot allocated to the child node, block 668 includes in a control message to the parent node an indication that sensor data will be sent in a next sensor data message time slot.

Figure 6B:
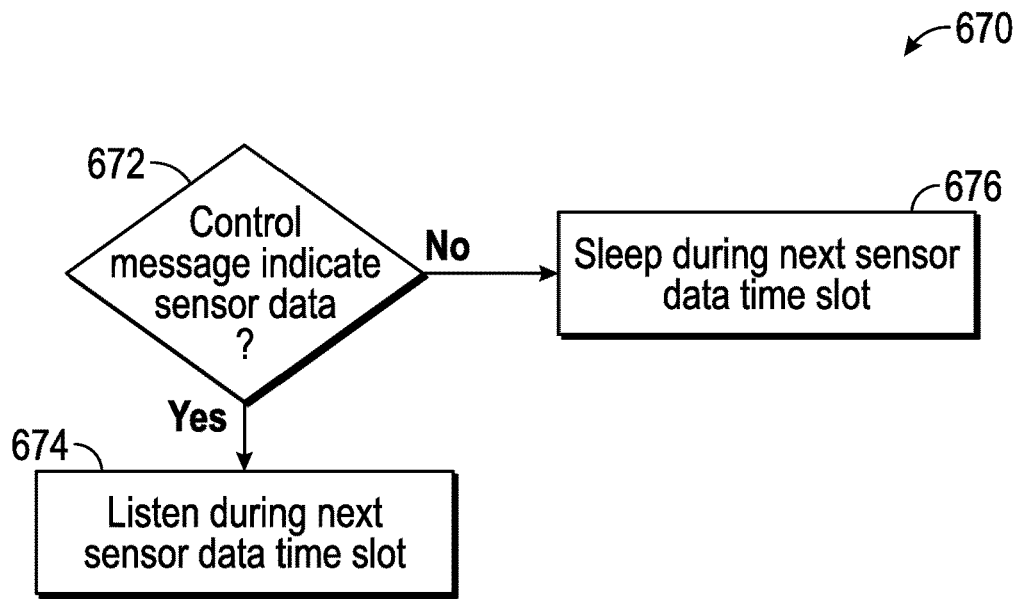
FIG. 6B is an illustrative process flow diagram indicating configuration of an MCU of a parent node to respond to sensor data indicator information provided in a child node control message to the parent node, according to some embodiments.

FIG. 6B is an illustrative process flow diagram 670 indicating configuration of an MCU 112 of a node such as node 102a operating as parent node in responding to sensor data indicator information provided in a child node control message to the parent node. Decision block 672 determines whether a received control message indicates that a child node will sensor data in a next sensor data message time slot allocated to the child node. In response to a determination that sensor data will be sent, block 674 causes the transceiver of the parent node to power up and listen during the next sensor data message time slot allocated to the child node. In response to a determination that sensor data will not be sent, block 676 causes the transceiver of the parent node to power down and not listen during the next sensor data message time slot allocated to the child node.

An MCU 112 of an instance of node 102a saves in local storage 118, sensor state information indicative of a sensor state of the node's sensor 106. A sensor 106 of a node 102 reports sensor data to the node's MCU 112. Upon the occurrence of an event that causes a sensor 106 to produce new sensor data that is to be reported up to the GW node 132, such as a sensor measurement reaching a threshold, for example, the MCU 112 produces a change in sensor state information indicative of the occurrence of new sensor data to be reported. As indicated in FIG. 5, periodic control signals transmitted from child node to its parent node. Sensor state information may be added to these periodic control messages in order to report sensor state information from a child node to its parent node. The sensor state information may be used as a skip indicator that indicates whether sensor data will be sent in a later sensor data time slot. A difference between the sensor state information in an earlier-received periodic control message and the sensor state information in a later-received periodic control is indicative of an occurrence of new sensor data to be reported by the child to the parent in a sensor data message to be sent during some future sensor data time slot. Conversely, identical state information within both an earlier-received periodic control message and a later-received control message is in indicative of an absence of new sensor data to be reported by the child to the parent in a sensor data message to be sent during some future sensor data time slot. Thus, the sensor state information may be used as an indicator of whether to skip sending sensor data during a subsequent sensor data time slot.

The MCU 112 of a node 102a actively manages operation of the node's transceiver 108 to conserve battery power. During time intervals while a transceiver 108 of a node 102a is neither scheduled to transmit nor scheduled to receive, the MCU 112 of the node 102a powers down the transceiver 108 causing the transceiver 108 to operate in a reduced power mode to conserve power. In some embodiments, the MCU 112 causes power to the transceiver 108 to be shut off during such time intervals.

The change or no-change status of sensor state information in a sequence of periodic control messages informs the MCU 112 of a parent node as to whether or not a child node will send a new sensor data message in a subsequent sensor data message time slot. On the one hand, if the sensor state information in a periodic control message received by a parent node from a child node is unchanged from a previous periodic control message, the MCU 112 for that parent node may determine that no sensor data message will be sent by the child node during a next sensor data message time slot, and as a result, the MCU 112 will skip listening for sensor data during that next sensor message time slot, and instead, will power down the transceiver 108 during that next time slot. On the other hand, if the sensor state information in a periodic control message received by a parent node from a child node is changed from a previous periodic control message, the MCU 112 of that parent node may determine that a sensor data message reporting new sensor data will be sent by the child node during a next sensor data time slot, and as a result, the MCU 112 will power up the transceiver 108 and listen during that next time slot. Thus, the periodic control signals carry sensor state information used to indicate to an MCU 112 of a parent node receiving the periodic control signals whether to power up or power down the receiving node's transceiver 108 during a subsequent sensor data message time slot.

In the hierarchical WSN 400 of FIG. 4, sensor data is passed through multiple hops to reach the GW node 432. Thus a parent node with more than one child node must have its transceiver powered up and listening during each sensor data slot when one of its child nodes is expected to report new sensor data. Moreover, a child node in a WSN hierarchy 400 of FIG. 4 reports to its parent node not only new sensor data produced by its own sensor, but also reports new sensor data reported to it by its own child nodes, i.e. by the grand-child nodes of its parent.

For example, Nodes $N_{111}$, $N_{112}$ and $N_{11v}$ each report new sensor data to their parent node $N_{11}$. Node $N_{11}$ in its role as a child of node $N_1$, in turn, reports new sensor data produced by its sensor 106 and new sensor data reported to it by each of its child nodes $N_{111}$, $N_{112}$ and $N_{11v}$ to its parent node $N_1$. Node $N_1$ is the parent node for nodes $N_{11}$, $N_{12}$ and $N_{1k}$, which are child nodes of node $N_1$. Accordingly, $N_{12}$ and $N_{1k}$ also each reports new sensor data produced by their sensors to node $N_1$. Node $N_1$, in turn, sends up to the GW 432, new sensor data reported up to it by each of nodes $N_{111}$, $N_{112}$, $N_{11v}$, $N_{11}$, $N_{12}$ and $N_{1k}$.

Thus, the MCU 112 of node $N_1$ powers up the $N_1$ transceiver 108 during each sensor data message time slot during which one of its child nodes $N_{11}$, $N_{12}$, $N_{1k}$, is expected to report new sensor data on its own behalf or on behalf of one of the child node's children or on behalf of one of the child node's grandchildren, for example. Conversely, the MCU 112 of node $N_1$ powers down the $N_1$ transceiver 108 during each sensor data time slot during which none of its child nodes $N_{11}$, $N_{12}$, $N_{1k}$, is expected to report new sensor data on its own behalf or on behalf of its child nodes, for example.

In accordance with some embodiments, a child node includes current sensor state information within a periodic control signal that it sends. The current state information is indicative of the current state of the sending node's own current sensor state and the current sensor state(s) of sensors of its own child nodes that send periodic control signals up to the sending node.

More particularly, the MCU 112 of each sensor node aggregates sensor state information reported up from its child nodes, the MCU 112 causing its transceiver 108 to include the aggregated sensor state information within a periodic control message that it sends to its parent node or to the GW 432. For example, node $N_{11}$ includes in a control message that it sends to its parent $N_1$ current sensor state information indicative of state of its own sensor 106 and indicative of current state information received by it within periodic control messages sent to it by each of its child nodes $N_{111}$, $N_{112}$, $N_{11v}$.

An MCU 112 of a parent node may use the current sensor state information within a received control message to determine the sensor data message time slots during which the parent expects to receive sensor data messages from child nodes. The parent node (e.g., using the MCU 112) may power up its transceiver 108 during these time slots and may power down otherwise. For example, node N1 must be powered up during a time slot when $N_{11}$ is scheduled to send a sensor data message if a current control message received by $N_1$ indicates that sensor state has changed for at least one of $N_{11}$, $N_{111}$, $N_{112}$ or $N_{112}$. Conversely, N1 may be powered down during a time slot when $N_{12}$ is scheduled to send a sensor data message if a current control message received from $N_{12}$ by $N_1$ indicates that sensor state for $N_{12}$ has not changed.

In a large WSN, the aggregated sensor state information may become large. In some embodiments, the sensor state data is carried in a control signal within a limited field. Accordingly, the aggregated state information is stored in a condensed form. Bit map and Bloom filter are techniques may be use to condense the sensor state. With Bloom filters, parent nodes may aggregate the state information from child nodes efficiently so that, when control messages are received by the network's coordinator (or gateway) 132, 413, it may readily pinpoint which sensors in the network have experienced significant state changes and a request to get that data may be performed, for example.

Figure 7:
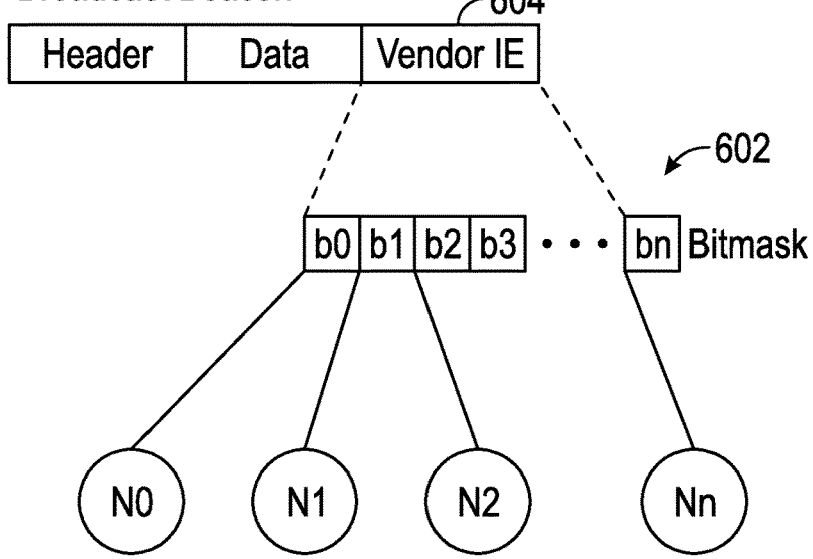
FIG. 7 is an illustrative drawing representing a bit map structure representing sensor state information for multiple sensor nodes carried within a control message frame, according to some embodiments.

FIG. 7 is an illustrative drawing showing a bit map structure 602 representing sensor state information for multiple sensor nodes carried within a control signal message frame 604 during a control message time slot. The control message 604 includes a control message header filed that may include information such as message type, message source and message destination. The control message 604 also includes message data such as a time stamp, for example. The sensor state bit map structure 602 is included within an extra field referred to herein as an information element (IE) field.

The bit map information in the example IE filed in FIG. 7 is produced by an MCU 112 of a node (not shown) that has a parent (or grandparent) relationship with nodes N0-Nn. The IE field contains bit b0 indicating sensor state of node N0, bit b1 indicating sensor state of node N1, bit b2 indicating sensor state of node N2 and bit bn indicating sensor state of node Nn. The parent node (not shown) sends the control message frame with the aggregated bit values to its parent or to a GW.

More particularly, node Ni, within a WSN produces sensor data $Di=\{S_0, S_1, \ldots, S_k\}$. When the sensor data of one of the sensors of node Ni experiences a substantial sensor data change (e.g., the MCU of node Ni determines that one of Ni's sensor data falls outside some predetermined range) the MCU of node Ni expresses the data change by changing the state of a bit value bi that represents sensor state of node Ni so as to indicate a change in node Ni sensor state. The MCU includes bi, with its changed state, within the IE field of a subsequent control message that node Ni sends to its parent node. The parent node (not shown) that receives a control messages from its child node Ni and from one or more other of its child nodes aggregates the sensor state information from the IE fields of control messages and its own sensor state information, as described above, into a larger bit map, which it includes in the IE field of a control message that it sends to its parent or to a GW. A GW node may upon observing the excursion reach out to the corresponding node for which sensor state has changed to fetch the sensor.

Figure 8:
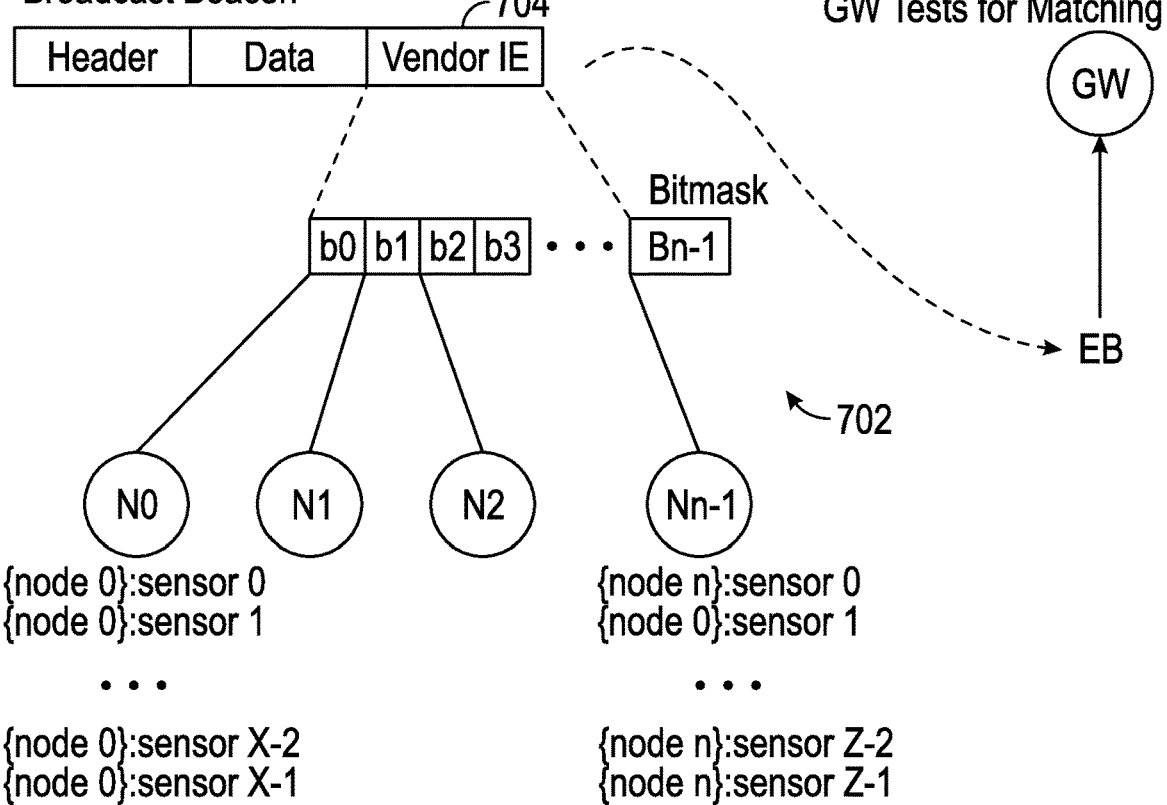
FIG. 8 is an illustrative drawing representing a bit map structure expressing a Bloom filter representing sensor state information for multiple sensor nodes within a control message frame, according to some embodiments.

Moreover, using the bitmap as a mask (e.g., bit mask) of child nodes, child nodes that currently have data to send may be readily identified and thus, the receiving parent node may determine the sensor data message time slots during which its transceiver must be powered up to receive a sensor data message, the transceiver allowed to power down otherwise. For example, if the bit mask received in control messages received from its child nodes indicates that only node Ni has a state change, then the parent node must be powered up during a subsequent sensor data message slot during which sensor data for node Ni is to be sent and may be powered down during subsequent time sensor data message slots allocated to other child nodes. FIG. 8 is an illustrative drawing representing a bit map structure 702 that is a Bloom filter representing sensor state information for multiple sensor nodes within a control message frame 704. The bitmask is a Bloom filter where k distinct hash functions are being used (k<<n−1). Each node is represented by a node ID and has a set of sensors associated with it. For example, node 0 is associated with sensor 0 to sensor X−1. Node n is associated with sensor 0 to sensor Z−1. The node 0 has X sensors, node n has Z sensors. The bloom filter may be realized so that each node represents its sensors using the k hash functions with input data uniquely identifying the node and sensor. Table B provides pseudo-code to indicate a process by which node i may express sensor m as follows in the bitmask:

TABLE B

```
// bitmask has n bits
d := node_id(i) | sensor_id(m)         // unique ID
b := 0                                  // bitmask
for each has function j                 //using k hash
functions
    b |= trunc( kj, (d), (2^n) −1 )    //bitmask for kj,
bitwise-OR
end for
```

With properly chosen lengths of the bit field and number of hash functions the gateway may efficiently determine if node-sensor tuples have had a state change with tuned false-positives based on the number of {node, sensor} tuples, hash-functions and length of the bit field. It is further more guaranteed to not raise false-negatives in the system.

Traffic Reduction Through Parent Sensor Data Aggregation

A parent node aggregates sensor data from multiple child nodes before reporting the sensor data up to the parent node's parent or to a GW. The amount of sensor data aggregation may be time-dependent based upon latency tolerance of an application for which the sensor data is collected, for example. Thus, there may be a tradeoff between sensor data aggregation that may result in fewer sensor data message transmission and delay in reporting the sensor data.

FIG. 9 is an illustrative process flow diagram 880 indicating configuration of an MCU 112 of a parent node to aggregate sensor data. Block 882 receives sensor data messages from multiple child nodes of the parent node during their allocated sensor data time slots. Block 884 stores the received sensor from the sensor data messages in a storage device together with an indication of time of receipt of the sensor data. Block 886 tracks the elapsed time since time of receipt of data for each sensor data message. Decision block 888 determines whether elapsed time since receipt of currently stored sensor data from any of the received messages has reached a threshold delay. Decision block 890 determines whether a storage device capacity threshold has been reached. In response to either 888 or 890 determining that its threshold has been reached, block 892 sends all currently stored sensor data to a next hop in the WSN. Block 894 flushes the currently stored data.

As explained with reference to FIG. 5, sensor nodes periodically report their sensor data up through a WSN 122, 400 towards a root node or coordinator device 132, 432. In a (tree) mesh formation each parent node is responsible for continuously relaying data up towards the root as data is received from child nodes. The scheduling overhead to accommodate this type of a reporting with a deep hop-count tree mesh networks with multiple children in each hop may quickly saturate and create choke-points in parent node connections due high volume of sensor data reporting messages. To improve the spectrum efficiency parent nodes may aggregate child node sensor data reports and perform report sensor data aggregated from multiple child sensor nodes in a single sensor message to better utilize the data-carrying capacity of the frames.

Sensor data passed up to a parent node and its arrival time are cached in a receiving parent node's 118 storage, and the parent node's MCU 112 monitors elapsed time since arrival of the sensor data while awaiting the arrival of additional sensor data from the same or different child nodes. Any additional sensor data that arrives before previously cached sensor data is transmitted up to a next hop also are cached and the arrival times of such additional sensor data also are also cached and monitored. A delay threshold may be selected by a network administrator, which may be a person or a management node, that may be calibrated to optimize a WSN's key performance indicators (KPIs) (e.g., latency vs. spectrum efficiency) for the network as a whole. The MCU 112 of the receiving parent node delays its transceiver's 108 sending of a sensor data message containing cached sensor data until after elapsed time from receipt of the sensor data of the earliest received currently cached sensor data meets the delay threshold. Upon the elapsed time from receipt of the earliest received currently cached sensor data meeting the delay threshold, the receiving parent node's MCU 112 causes its node's transceiver to send within a single sensor data message currently cached data to a next hop.

Thus, in the event that additional sensor data arrives at a parent node from one or more child nodes before the elapsed time arrives for the earlier arrived currently cached sensor data, the node's MCU 112, upon expiration of the delay threshold for the earliest received currently cached sensor data, may aggregate the earlier received currently cached data and the additional received sensor data and cause its transceiver 108 to send it to a next hop within a single sensor data message and cause. Thus, the MCU 112 delays transmission of sensor data received from a child node long enough to allow time for receipt of additional sensor data from other child nodes that may be aggregated into a sensor data message with previously received sensor data, but the MCU 112 causes sensor data caching delay of no more than a selected delay threshold.

Moreover, the delay time also may be dependent upon a parent node's storage capacity. A node's MCU 112 may cause its node's transceiver 108 to send cached data before the delay threshold has elapsed in the event that the amount of stored data meeting a cache storage threshold. Thus, cached data may be sent prior to the earliest received cached sensor data reaching the delay threshold if cache storage fills to a cache storage threshold that may be set based upon a node's individual storage capacity.

Figure 10:
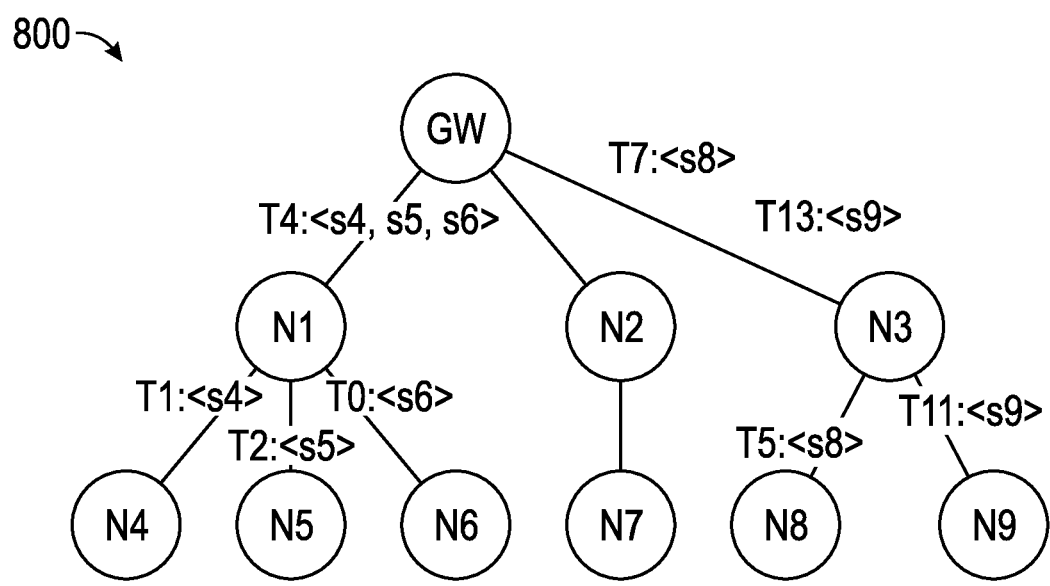
FIG. 10 is an illustrative drawing showing an example WSN in which sensor data reporting is aggregated based upon time of receipt, according to some embodiments.

FIG. 10 is an illustrative drawing showing an example WSN 800 in which sensor data reporting is aggregated based upon time of receipt. In this example, parent node N1 has a delay threshold T=4, and parent node N3 has a delay threshold T=2. Child node N4 sends sensor data <s4> to its parent node N1 at time T1; child node N5 sends sensor data <s5> to its parent node N1 at time T2; child node N6 sends sensor data <s6> to its parent node N1 at time T0. Child node N8 sends sensor data <s8> to its parent node N3 at time T5; child node N9 sends sensor data <s9> to its parent node N1 at time T9.

Table C shows aggregation of sensor data received from different in parent nodes N1 and N3 in this example.

TABLE C

| Time | N1 Cached Sensor Data | N3 Cached Sensor Data |
|---|---|---|
| T0 | S6 | — |
| T1 | S6, S4 | — |
| T2 | S6, S4, S5 | — |
| T3 | S6, S4, S5 | — |
| T4 | Send S6, S4, S5 to GW | — |
| T6 | — | S8 |
| T7 | — | S8 |
| T8 | — | Send S8 to GW |
| T9 | — | — |
| T10 | — | — |

TABLE C-continued

| Time | N1 Cached Sensor Data | N3 Cached Sensor Data |
|---|---|---|
| T11 | — | S9 |
| T12 | — | — |
| T13 | — | Send S9 to GW |

Referring to FIG. 10 and to Table C, node N1 aggregates S6, S4 and S5 and sends these sensor data upon elapse of N1's T=4 delay threshold from the time when the earliest cached data, S6. N3 sends sensor data S8 upon elapse of N3's T=2 delay threshold from the time when S8 arrived. N3 sends sensor data S9 upon elapse of N3's T=2 delay threshold from the time when S9 arrived. N3 does not aggregate S8 and S9 since the delay threshold for S8 expired before the arrival of S9.

Reduce Power Consumption Through Opportunistic Sleep Signaling

A child node may indicate to its parent node through control messages that it will be sleeping for certain time interval. As a result, the parent node does not have to listen during time intervals when its child node has indicated that no data will be sent, which reduces power consumption and improves spectrum efficiency.

Figure 11A:
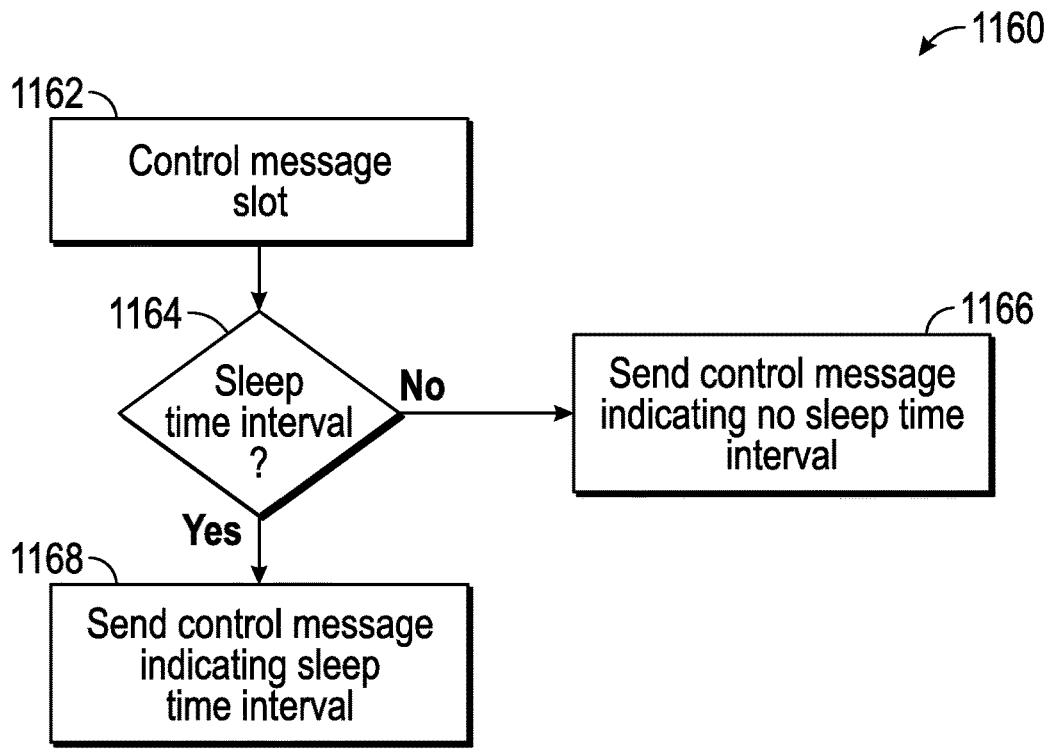
FIG. 11A is an illustrative process flow diagram indicating configuration of a child node to determine and send a sensor data indicator a child node control message to a parent node, according to some embodiments.

FIG. 11A is an illustrative process flow diagram 1160 indicating configuration of an MCU 112 of a child node to determine and send a sensor data indicator a child node control message to a parent node. Block 1162 identifies timing of a control message time slot interval allocated to the child device. Decision block 1164 determines whether the sensor of the child will sleep during an upcoming sleep time interval. In response to a determination that the child node will sleep during an upcoming sleep time interval, block 666 includes in a control message to the parent an indication of a sleep time interval during which the child will sleep. In response to a determination that will not sleep, block 668 includes in a control message to the parent node an indication that the child node will not sleep.

Figure 11B:
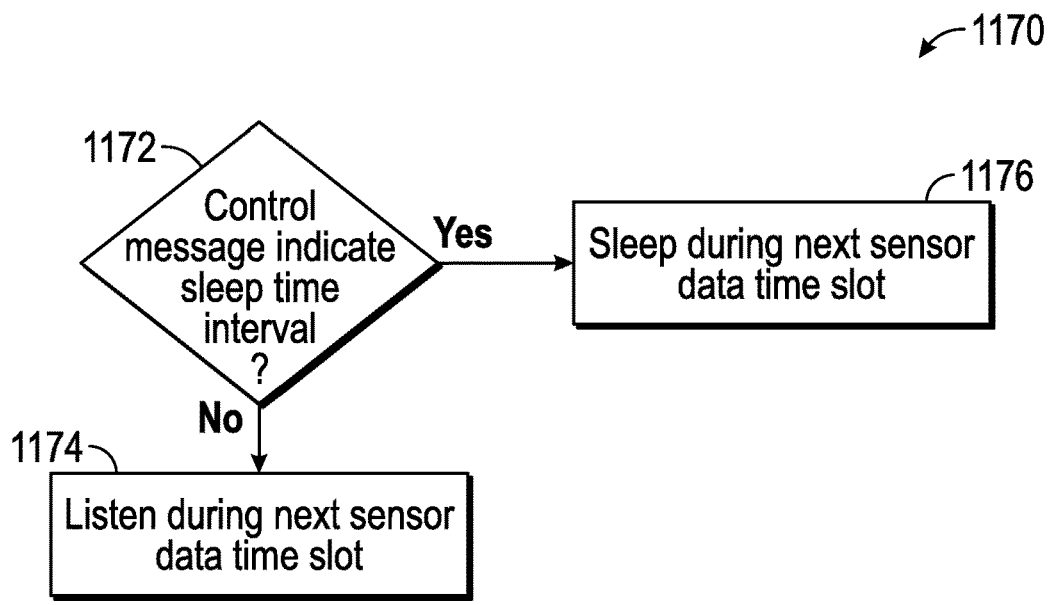
FIG. 11B is an illustrative process flow diagram indicating configuration of a parent node in responding to sensor data indicator information provided in a child node control message to the parent node, according to some embodiments.

FIG. 11B is an illustrative process flow diagram 1170 indicating configuration of an MCU 112 of a parent node in responding to sensor data indicator information provided in a child node control message to the parent node. Decision block 1172 determines whether a received control message indicates that a child node will sleep during a sleep time interval. In response to a determination that sensor data will not sleep, block 1174 causes the transceiver of the parent node to power up and listen during the next sensor data message time slot allocated to the child node. In response to a determination that sensor will sleep during a subsequent sleep time interval, block 1176 causes the transceiver of the parent node to power down and not listen during time slots allocated to the child that occur during the sleep time interval.

Referring again to FIG. 4, in accordance with some WSN routing protocols child nodes are responsible for sending periodic control messages to their parent nodes. Thus, for example, node $N_{11}$ sends periodic control messages to node $N_1$. As explained above, the control messages may indicate to the parent nodes that the child nodes are still 'alive' in the WSN, for example. The MCU 112 of child node $N_{11}$, for example, may determine that node $N_{11}$ will enter a reduced power mode of operation for some period of time referred to herein as a sleep time period. During that sleep time period, the node $N_{11}$ MCU 112 may cause the $N_{11}$ transceiver 108 to send no sensor data messages, although periodic control messages may continue to be sent. Alternatively, for example, the $N_{11}$ MCU 112 may cause a sleep mode in which during the sleep time period, the transceiver 108 sends neither control messages nor sensor data messages. While the node $N_{11}$ sleeps, its transceiver 108 may operate in a low power mode or may be shut-off to conserve power.

Continuing with the example, prior to entering a sleep mode, the child node $N_{11}$ sends to its parent node $N_1$ within a periodic control message an indication that it will go into a sleep mode for a specified sleep time period. In response to a child node $N_{11}$'s indication that it will enter into a sleep mode for a specified sleep time period, the parent node $N_1$'s MCU 112 causes its transceiver 108 to not listen for a sensor data messages during sensor data time slots allocated to the sleeping child node $N_{11}$ during the indicated sleep time period. In the event that the child node $N_{11}$ indicates in the control message that it will send neither control messages nor sensor data messages during the sleep time period, the parent node $N_1$'s MCU 112 causes its transceiver 108 to listen for neither control messages nor sensor data messages during time slots allocated to the sleeping child node during the sleep time period. To conserve power during slots allocated to a sleeping node $N_{11}$, node $N_1$'s MCU 112 may cause the node $N_1$ transceiver 108 to operate in a low power mode or may shut-off the node $N_1$ transceiver. For shared slots, all of the children would have to indicate to the parent that they will sleep in order for the parent to not listen during shared among multiple child nodes.

Configurable Messages

Application and control messages format may be provisioned at runtime to improve power efficiency. Payload sizes within a message may be limited. A typical message types often have a fixed format where specific data is at predefined byte offsets within the payload. For example, a control message may have a fixed payload. Similarly, an application message may have affixed payload. A configurable message in accordance with some embodiments allows for the optimization of the available payload size by tailoring the message format for a particular use case. The configuration of the message may be done either a priori via provisioning of the sensor nodes or dynamically from a GW through broadcast, unicast, or connection-oriented messages to the sensor nodes.

Configurable messages allow for defining what sensor values are included in a sensor node's message or even at what offsets specific data values are located. This capability may be used in conjunction with using a bitmap to indicate sensor node state changes as described in the preceding section.

For example, consider a scenario where a GW 132, 432 receives and aggregates data from a number of sensor nodes that may report temperature and humidity. The GW may cause reconfiguration of a message payload format to dynamically configure a subset of the sensor nodes to report only temperature data at a given offset and the remaining nodes to report only message humidity data at a specified offset. This will reduce the size of the payload from each node, thereby reducing transmit time and power consumption. This result also may be achieved through provisioning each node before deployment to either report temperature or humidity.

In accordance with some embodiments, message payload is configured to store key-value pairs to be transmitted within the message payload. For example, a sensor node that has a temperature sensor could write a key-value pair such as "temp:28.5" in a vendor specific portion of the payload. Given the limited payload size in the message, the key-value pair could be encoded using a compact representation such as RFC7049 Concise Binary Object Representation (CBOR). Using key-value pairs enables a scalable solution for use cases that have a large number of sensor nodes. When using the key-value pairs, the GW is no longer required to keep track of how each sensor node is configured in order to extract sensor values at specific offsets from dynamically or a priori provisioned nodes. Instead, the GW may parse the key-value data contained in the configurable message. In addition, key-value pairs allow for efficient transfer of a sensor node from one GW to another GW for load balancing or handoff. The receiving GW is not required to have a priori knowledge of the formatting of the sensor node's configurable message as it may ascertain this information by reading the key-values pairs.

Figure 12:
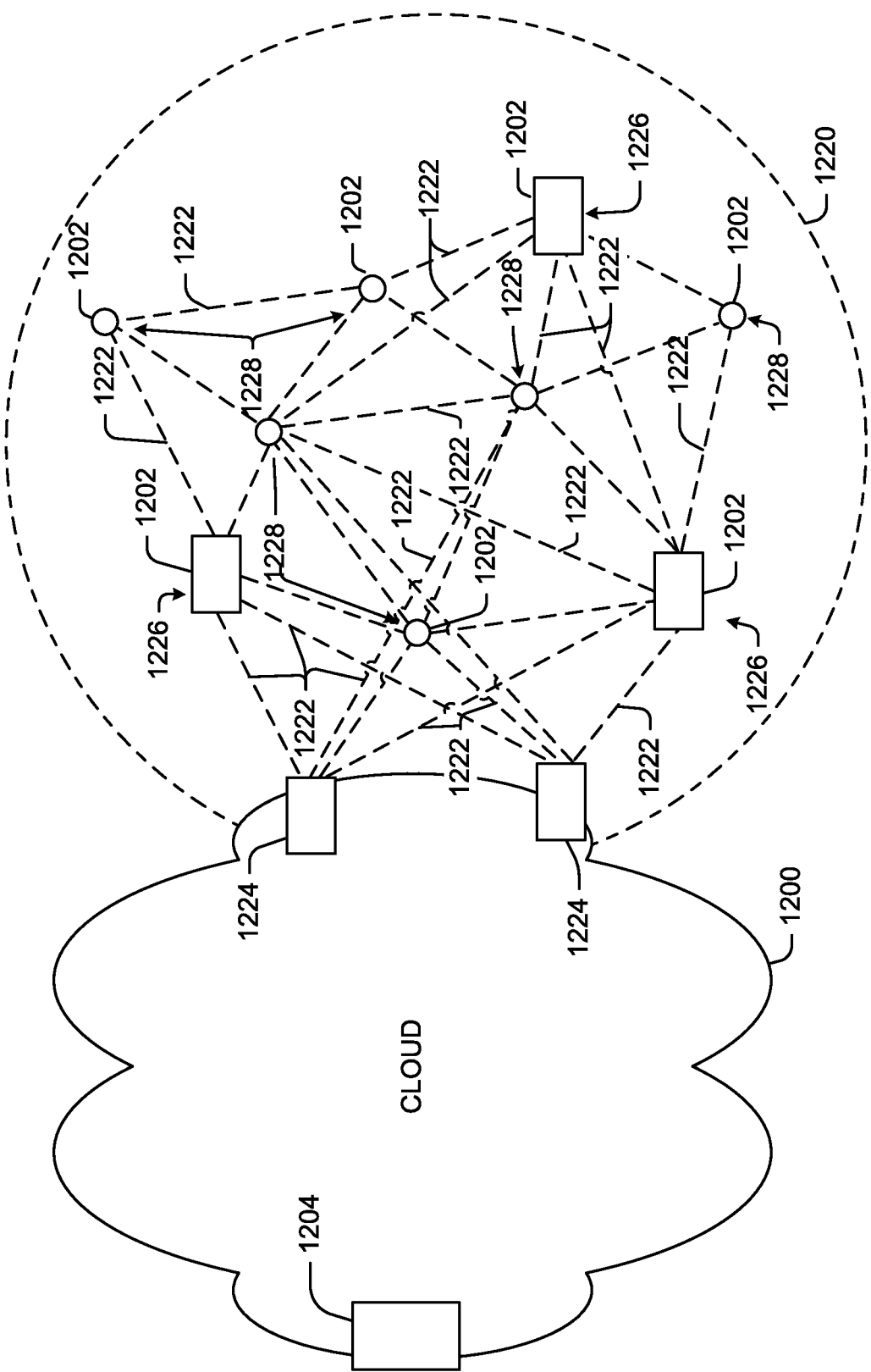
FIG. 12 illustrates an example of a cloud and Internet of Things (IoT) mesh network topology, according to some embodiments.

FIG. 12 is a drawing of a cloud computing network, or cloud 1200, in communication with a mesh network of IoT devices 1202, that may be termed a fog 1220, operating at the edge of the cloud 1200. To simplify the diagram, not every IoT device 1202 is labeled.

The fog 1220 may be considered to be a massively interconnected network wherein a number of IoT devices 1202 are in communications with each other, for example, by radio links 1222. This may be performed using the open interconnect consortium (OIC) standard specification 3.0 released by the Open Connectivity Foundation™ (OCF) on Dec. 23, 2015. This standard allows devices to discover each other and establish communications for interconnects. Other interconnection protocols may also be used, including, for example, the optimized link state routing (OLSR) Protocol, or the better approach to mobile ad-hoc networking (B.A.T-.M.A.N.), among others.

Three types of IoT devices 1202 are shown in this example, gateways 1224, data aggregators 1226, and sensors 1228, although any combinations of IoT devices 1202 and functionality may be used. The gateways 1224 may be edge devices that provide communications between the cloud 1200 and the fog 1220, and may also provide the backend process function for data obtained from sensors 1228, such as motion data, flow data, temperature data, and the like. The data aggregators 1226 may collect data from any number of the sensors 1228, and perform the back end processing function for the analysis. The results, raw data, or both may be passed along to the cloud 1200 through the gateways 1224. The sensors 1228 may be full IoT devices 1202, for example, capable of both collecting data and processing the data. In some cases, the sensors 1228 may be more limited in functionality, for example, collecting the data and allowing the data aggregators 1226 or gateways 1224 to process the data.

Communications from any IoT device 1202 may be passed along the most convenient path between any of the IoT devices 1202 to reach the gateways 1224. In these networks, the number of interconnections provide substantial redundancy, allowing communications to be maintained, even with the loss of a number of IoT devices 1202. Further, the use of a mesh network may allow IoT devices 1202 that are very low power or located at a distance from infrastructure to be used, as the range to connect to another IoT device 1202 may be much less than the range to connect to the gateways 1224.

Figure 13:
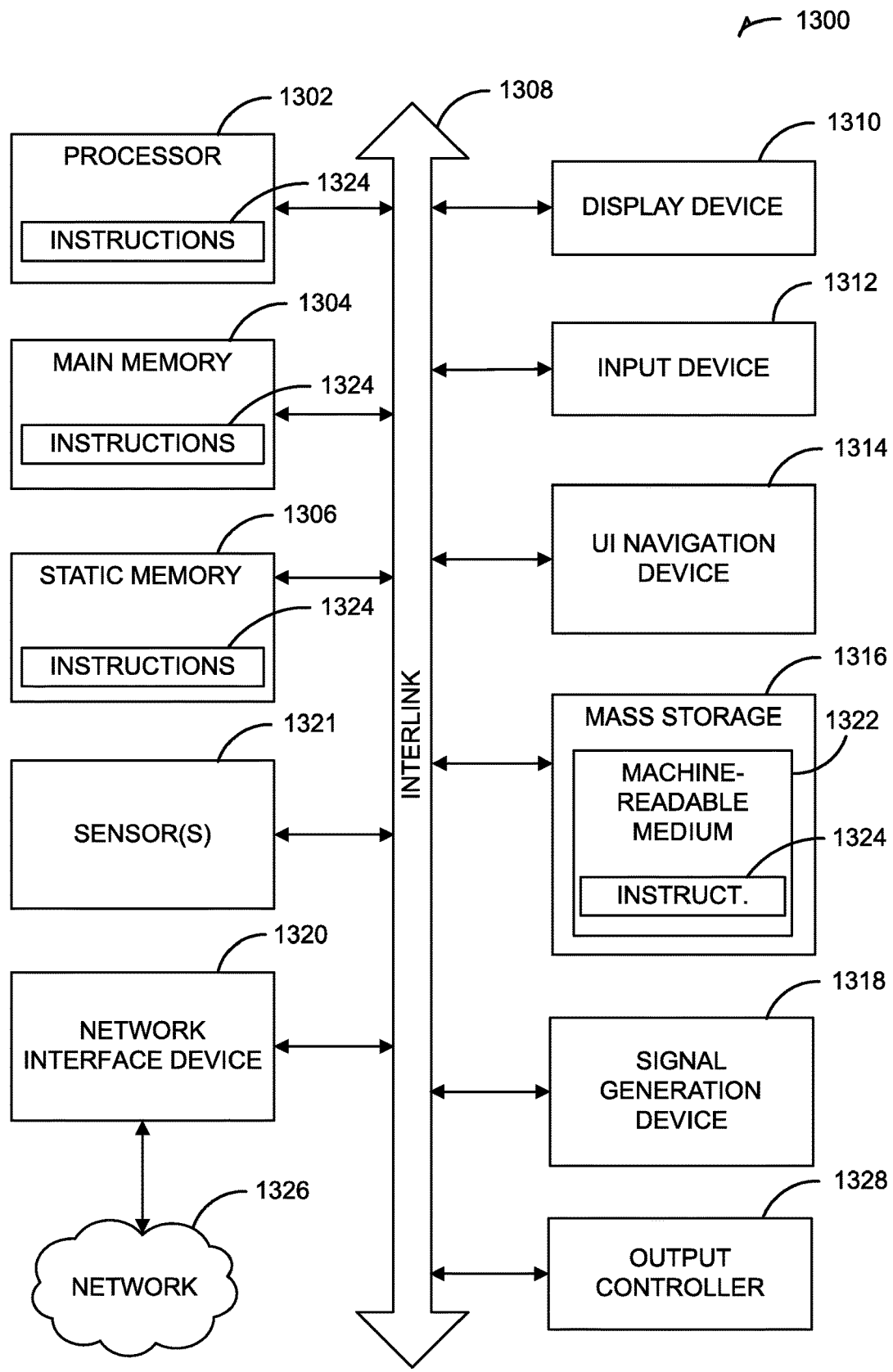
FIG. 13 is a block diagram illustrating an example of a machine upon which one or more embodiments may be implemented.

The fog 1220 of these IoT devices 1202 devices may be presented to devices in the cloud 1200, such as a server 1204, as a single device located at the edge of the cloud 1200, e.g., a fog 1220 device. In this example, the alerts coming from the fog 1220 device may be sent without being identified as coming from a specific IoT device 1202 within the fog 1220. In some examples, the IoT devices 1202 may be configured using an imperative programming style, e.g., with each IoT device 1202 having a specific function and communication partners. However, the IoT devices 1202 forming the fog 1220 device may be configured in a declarative programming style, allowing the IoT devices 1202 to reconfigure their operations and communications, such as to determine needed resources in response to conditions, queries, and device failures. As an example, a query from a user located at a server 1204 about the operations of a subset of equipment monitored by the IoT devices 1202 may result in the fog 1220 device selecting the IoT devices 1202, such as particular sensors 1228, needed to answer the query. The data from these sensors 1228 may then be aggregated and analyzed by any combination of the sensors 1228, data aggregators 1226, or gateways 1224, before being sent on by the fog 1220 device to the server 1204 to answer the query. In this example, IoT devices 1202 in the fog 1220 may select the sensors 1228 used based on the query, such as adding data from flow sensors or temperature sensors. Further, if some of the IoT devices 1202 are not operational, other IoT devices 1202 in the fog 1220 device may provide analogous data, if available. FIG. 13 illustrates a block diagram of an example machine 1300 upon which any one or more of the techniques (e.g., methodologies) discussed herein may perform. In alternative embodiments, the machine 1300 may operate as a standalone device or may be connected (e.g., networked) to other machines. In a networked deployment, the machine 1300 may operate in the capacity of a server machine, a client machine, or both in server-client network environments. In an example, the machine 1300 may act as a peer machine in peer-to-peer (P2P) (or other distributed) network environment. The machine 1300 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 1300 may include a hardware processor 1302 (e.g., a central processing unit (CPU), a graphics processing unit (GPU), a hardware processor core, or any combination thereof), a main memory 1304 and a static memory 1306, some or all of which may communicate with each other via an interlink (e.g., bus) 1308. The machine 1300 may further include a display unit 1310, an alphanumeric input device 1312 (e.g., a keyboard), and a user interface (UI) navigation device 1314 (e.g., a mouse). In an example, the display unit 1310, input device 1312 and UI navigation device 1314 may be a touch screen display. The machine 1300 may additionally include a storage device (e.g., drive unit) 1316, a signal generation device 1318 (e.g., a speaker), a network interface device 1320, and one or more sensors 1321, such as a global positioning system (GPS) sensor, compass, accelerometer, or other sensor. The machine 1300 may include an output controller 1328, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1316 may include a machine readable medium 1322 on which is stored one or more sets of data structures or instructions 1324 (e.g., software) embodying or utilized by any one or more of the techniques or functions described herein. The instructions 1324 may also reside, completely or at least partially, within the main memory 1304, within static memory 1306, or within the hardware processor 1302 during execution thereof by the machine 1300. In an example, one or any combination of the hardware processor 1302, the main memory 1304, the static memory 1306, or the storage device 1316 may constitute machine readable media.

While the machine readable medium 1322 is illustrated as a single medium, the term "machine readable medium" may include a single medium or multiple media (e.g., a centralized or distributed database, and/or associated caches and servers) configured to store the one or more instructions 1324.

The term "machine readable medium" may include any medium that is capable of storing, encoding, or carrying instructions for execution by the machine 1300 and that cause the machine 1300 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks. The instructions 1324 may further be transmitted or received over a communications network 1326 using a transmission medium via the network interface device 1320 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMAX®), IEEE 802.15.4 family of standards, peer-to-peer (P2P) networks, among others. In an example, the network interface device 1320 may include one or more physical jacks (e.g., Ethernet, coaxial, or phone jacks) or one or more antennas to connect to the communications network 1326. In an example, the network interface device 1320 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1300, and includes digital or analog communications signals or other intangible medium to facilitate communication of such software.

Additional Notes & Examples

Example 1 is a wireless sensor network comprising: a node comprising: a node transceiver to listen for: periodic control messages; and periodic sensor data messages; and a node microcontroller unit (MCU) to determine whether to cause the transceiver to skip listening for a periodic sensor data message during a sensor data time period based upon a skip indicator included in a periodic control message.

In Example 2, the subject matter of Example 1 optionally includes a child node that includes a child transceiver, a child sensor, and a child MCU; wherein the child MCU to: cause the child node transceiver to send the periodic control messages to the node transceiver and to send the periodic sensor data messages to the node transceiver.

In Example 3, the subject matter of any one or more of Examples 1-2 optionally include wherein the node MCU is to: determine whether to skip listening for a periodic sensor data message during a sensor data time period based upon child transceiver sleep time interval information provided in a skip indicator included in the periodic control message.

In Example 4, the subject matter of any one or more of Examples 1-3 optionally include wherein the node MCU is to: determine whether to skip listening for a periodic sensor data message during a sensor data time period based upon information indicating whether a child node has sensor data to be sent provided in a skip indicator included in the periodic control message.

In Example 5, the subject matter of any one or more of Examples 1-4 optionally include wherein the node MCU is to: determine whether to skip listening for a periodic sensor data message during a sensor data time period based upon child node sensor data state information provided in a skip indicator included in the periodic control message.

In Example 6, the subject matter of any one or more of Examples 1-5 optionally include a child node that includes a child transceiver, a child sensor, and a child MCU; wherein the child MCU is to: cause the child transceiver to send the periodic control messages to the node transceiver and to send the periodic sensor data messages to the node transceiver, and cause the child transceiver to include the skip indicator in the periodic control messages to provide an indication of whether the sensor has data to be sent.

In Example 7, the subject matter of any one or more of Examples 1-6 optionally include a child node that includes a child transceiver, a child sensor, and a child MCU; wherein the child MCU is to: cause the child transceiver to send the periodic control messages to the node transceiver and to send the periodic sensor data messages to the node transceiver, cause the child transceiver to include the skip indicator in the periodic control messages to provide an indication of whether the sensor data state for the child sensor has data to be sent, and cause the child transceiver to skip sending a periodic sensor data message following a control message that includes a skip indicator that indicates that the child sensor has no data to be sent.

In Example 8, the subject matter of any one or more of Examples 1-7 optionally include a child node that includes a child transceiver, a child sensor, and a child second MCU; wherein the child MCU is to: cause the child transceiver to send the periodic control messages to the node transceiver and to send the periodic sensor data messages to the node transceiver, cause the child transceiver to include the skip indicator in the periodic control messages to provide an indication of whether the child sensor has data to be sent, cause the child transceiver to skip sending a periodic sensor data message following a control message that includes a skip indicator that indicates that the child sensor has no data to be sent, and cause the child transceiver to send a periodic sensor data message following a control message that includes a skip indicator that indicates that the child sensor has data to be sent.

In Example 9, the subject matter of any one or more of Examples 1-8 optionally include a child node that includes a child transceiver, a child sensor, and a child MCU; wherein the child MCU is to: cause the child transceiver to send the periodic control messages to the node transceiver and to send the periodic sensor data messages to the node transceiver, determine whether the child sensor has data to be sent, cause the child transceiver to include the skip indicator in the periodic control messages to provide an indication, based upon the determination, of whether the child sensor has data to be sent, cause the child transceiver to skip sending a periodic sensor data message following a control message that includes a skip indicator that indicates that the child sensor has no data to be sent, and cause the child transceiver to send a periodic sensor data message following a control message that includes a skip indicator that indicates that the child sensor has data to be sent.

In Example 10, the subject matter of any one or more of Examples 1-9 optionally include a child node that includes a child transceiver and a child sensor, and a child MCU; wherein the second MCU is to: cause the second transceiver to send the periodic control messages to the node transceiver and to send the periodic sensor data messages to the node transceiver, and cause the child transceiver to include the skip indicator in the periodic control messages to provide an indication of a sleep time interval when the child transceiver will not transmit.

In Example 11, the subject matter of any one or more of Examples 1-10 optionally include a child node that includes a child transceiver and a child sensor, and a child MCU; wherein the child MCU is to: cause the child transceiver to send the periodic control messages to the node transceiver and to send the periodic sensor data messages to the node transceiver, cause the child transceiver to include the skip indicator in the periodic control messages to provide an indication of a sleep time interval when the child transceiver will not transmit, and cause the child transceiver to sleep during the sleep time interval.

In Example 12, the subject matter of any one or more of Examples 1-11 optionally include a child node that includes a child transceiver and a child sensor, and a child MCU; wherein the child MCU is to: cause the child transceiver to send the periodic control messages to the node transceiver and to send the periodic sensor data messages to the node transceiver, determine whether to cause the child transceiver to sleep, cause the child transceiver to send the periodic control messages to the node transceiver and to send the periodic sensor data messages to the node transceiver, cause the child transceiver to include the skip indicator in the periodic control messages to provide an indication of a sleep time interval when the child transceiver will not transmit, and cause the child transceiver to sleep during the sleep time interval.

Example 13 is a wireless sensor network comprising: a node that includes a node transceiver and a node microcontroller unit (MCU); and multiple child nodes of the first node that each includes a child transceiver, a child sensor, and a child MCU; wherein the node MCU is to, cause the node transceiver to listen for periodic control messages from each of the multiple child nodes, cause the node transceiver to listen for periodic sensor data messages from each of the child nodes, and determine whether to skip listening for periodic sensor data messages from one or more of the child nodes during one or more sensor data message time periods allocated to the one or more child nodes based upon skip indicators indicating sensor data state of sensors of the one or more child nodes that are included in the periodic control message received from the one or more child nodes, and wherein the child MCU of each child node is to: cause the child transceiver of the child node to send a periodic control message to the node transceiver and to send a periodic sensor data message to the node transceiver, and cause the child transceiver of the child node to include a skip indicator within the periodic control message sent, to provide an indication of sensor data state of a sensor of the child node.

Example 14 is a wireless sensor network comprising: a node that includes a node transceiver, a node microcontroller unit (MCU), and a node storage device; and multiple child nodes of the node that each includes a child transceiver, a child sensor, and a child MCU; wherein the node MCU is to, cause the node transceiver to listen for periodic control messages from each of the multiple child nodes, cause the node transceiver to listen for periodic sensor data messages from each of the child nodes, and store in the storage device an indication of the sensor data state of each of the child nodes based upon sensor data state information included in the periodic control message received from the each of child nodes; and wherein the child MCU of each child node is to: cause the transceiver of the child node to send a periodic control message to the node transceiver and to send a periodic sensor data message to the node transceiver, and cause the transceiver of the child node to include an indication of sensor data state of a sensor of the child node.

In Example 15, the subject matter of Example 14 optionally includes wherein the node MCU is to: store, in the node storage device, the indication of the sensor data state of each of the child nodes in a bit mask format.

In Example 16, the subject matter of any one or more of Examples 14-15 optionally include wherein the node MCU is to: store, in the node storage device, the indication of the sensor data state of each of the child nodes in a Bloom filter bit mask format.

Example 17 is a wireless sensor network comprising: a first node that includes a first transceiver; and a second node that includes a second transceiver, a first microcontroller unit (MCU), and a storage device; multiple third nodes, each including a transceiver, each including a second MCU, and each including a sensor, each associated with different periodic time slots; wherein the MCU of each third node is to: cause the transceiver of the third node to send to the transceiver of the second node sensor data, produced by a sensor of the third node, during one or more time slots associated with the third node; and wherein the MCU of the second node is to: cause the transceiver of the second node to receive sensor data messages transmitted from the transceivers of one or more of the third nodes, store sensor data received within the received sensor data messages in the storage device, track elapsed time from receipt of each received sensor data to identify stored sensor data for which elapsed time from receipt reaches a delay threshold, and send the identified stored sensor data together with stored sensor data received after receipt of the identified stored sensor data to the transceiver of the first node.

In Example 18, the subject matter of Example 17 optionally includes wherein the MCU of the second node is to: flush from the storage device the identified stored sensor data the stored sensor data received after receipt of the identified stored sensor data.

In Example 19, the subject matter of any one or more of Examples 17-18 optionally include wherein the MCU of the second node is to: track remaining storage capacity of the storage device to determine whether the remaining storage capacity falls to a remaining storage threshold, and send the stored sensor data to the transceiver of the first node in response to the remaining storage capacity reaching the storage threshold.

Example 20 is a wireless sensor network comprising: a first node that includes a first transceiver; and a second node that includes a transceiver, a first type of sensor, a second type of sensor, and a MCU; wherein the MCU of the first node is to: selectably cause only one of the first type of sensor and the second type of sensor to be operative, receive sensor data produced by the operative one of the first type of sensor and the second type of sensor, in response to receiving sensor data, assemble a sensor data message that includes sensor data payload corresponding only to the operative one of the first type of sensor and the second type of sensor, and cause the second wireless transceiver to send the assembled message to the first transceiver.

In Example 21, the subject matter of Example 20 optionally includes wherein, to assemble the sensor data message, the MCU of the first node is to provide in the sensor data message a sensor type identifier that identifies the selected one of the first type of sensor and second type of sensor.

In Example 22, the subject matter of any one or more of Examples 20-21 optionally include wherein the MCU of the second node is to: selectably cause only one of the first type of sensor and the second type of sensor to be operative, receive sensor data produced by the operative one of the first type of sensor and the second type of sensor, in response to receiving sensor data, assemble a message that includes sensor data payload corresponding only to the operative one of the first type of sensor and the second type of sensor, and cause the second wireless transceiver to send the assembled message to the first transceiver.

Example 23 is a method to skip periodic sensor data messages in a wireless sensor network comprising: causing a transceiver in a parent node to listen for periodic control messages, causing the transceiver to listen for periodic sensor data messages, and determining whether to cause the parent node transceiver to skip listening for a periodic sensor data message during a sensor data time period based upon a skip indicator included in a periodic control message.

In Example 24, the subject matter of Example 23 optionally includes causing a child node transceiver in a second node to send the periodic control messages to the node transceiver and to send the periodic sensor data messages to the node transceiver.

In Example 25, the subject matter of any one or more of Examples 21-24 optionally include determining whether to skip listening for a periodic sensor data message during a sensor data time period based upon second transceiver sleep time interval information provided in a skip indicator included in the periodic control message.

In Example 26, the subject matter of any one or more of Examples 23-25 optionally include determining whether to skip listening for a periodic sensor data message during a sensor data time period based upon information indicating whether the sensor has data to be sent provided in a skip indicator included in the periodic control message.

In Example 27, the subject matter of any one or more of Examples 23-26 optionally include determining whether to skip listening for a periodic sensor data message during a sensor data time period based upon sensor data state information provided in a skip indicator included in the periodic control message.

In Example 28, the subject matter of any one or more of Examples 23-27 optionally include causing a second transceiver in a second node to send the periodic control messages to the parent node transceiver and to send the periodic sensor data messages to the parent node transceiver, and causing the second transceiver to include the skip indicator in the periodic control messages to provide an indication of whether sensor has data to be sent.

In Example 29, the subject matter of any one or more of Examples 23-28 optionally include causing a second transceiver in a second node to send the periodic control messages to the parent node transceiver and to send the periodic sensor data messages to the parent node transceiver, causing the second transceiver to include the skip indicator in the periodic control messages to provide an indication of whether sensor data state for the sensor has data to be sent, and causing the second transceiver to skip sending a periodic sensor data message following a control message that includes a skip indicator that indicates that a sensor of a second node has no data to be sent.

In Example 30, the subject matter of any one or more of Examples 23-29 optionally include causing a second transceiver in a second node to send the periodic control messages to the parent node transceiver and to send the periodic sensor data messages to the parent node transceiver, causing the second transceiver to include the skip indicator in the periodic control messages to provide an indication of whether sensor has data to be sent, and causing the second transceiver to skip sending a periodic sensor data message following a control message that includes a skip indicator that indicates that a sensor of the second node has no data to be sent, and causing the second transceiver to send a periodic sensor data message following a control message that includes a skip indicator that indicates that the sensor has data to be sent.

In Example 31, the subject matter of any one or more of Examples 23-30 optionally include causing a second transceiver in a second node to send the periodic control messages to the parent node transceiver and to send the periodic sensor data messages to the parent node transceiver, determining whether a sensor on the second node has data to be sent, causing the second transceiver to include the skip indicator in the periodic control messages to provide an indication, based upon the determination, of whether sensor has data to be sent, causing the second transceiver to skip sending a periodic sensor data message following a control message that includes a skip indicator that indicates that a sensor of the second node has no data to be sent, and causing the second transceiver to send a periodic sensor data message following a control message that includes a skip indicator that indicates that the sensor has data to be sent.

In Example 32, the subject matter of any one or more of Examples 23-31 optionally include causing a second transceiver of a second node to send the periodic control messages to the parent node transceiver and to send the periodic sensor data messages to the parent node transceiver, and causing the second transceiver to include the skip indicator in the periodic control messages to provide an indication of a sleep time interval when the second transceiver will not transmit.

In Example 33, the subject matter of any one or more of Examples 23-32 optionally include causing a second transceiver of a second node to send the periodic control messages to the parent node transceiver and to send the periodic sensor data messages to the parent node transceiver, and causing the second transceiver to include the skip indicator in the periodic control messages to provide an indication of a sleep time interval when the second transceiver will not transmit, and causing the second transceiver to sleep during the sleep time interval.

In Example 34, the subject matter of any one or more of Examples 23-33 optionally include causing a second transceiver of a second node to send the periodic control messages to the parent node transceiver and to send the periodic sensor data messages to the parent node transceiver, determining whether to cause the second transceiver to sleep, causing the second transceiver to send the periodic control messages to the parent node transceiver and to send the periodic sensor data messages to the parent node transceiver, and causing the second transceiver to include the skip indicator in the periodic control messages to provide an indication of a sleep time interval when the second transceiver will not transmit, and causing the second transceiver to sleep during the sleep time interval.

Example 35 is a method to skip periodic sensor data messages in a wireless sensor network comprising: causing a parent node transceiver of a parent node to listen for periodic control messages from each of the multiple child nodes, causing the parent node transceiver to listen for periodic sensor data messages from each of the child nodes, determining whether to skip listening for periodic sensor data messages from one or more of the child nodes during one or more sensor data message time periods allocated to the one or more child nodes based upon skip indicators indicating sensor data state of sensors of the one or more child nodes that are included in the periodic control message received from the one or more child nodes.

Example 36 is a method to skip periodic sensor data messages in a wireless sensor network comprising: causing a parent node transceiver of a parent node to listen for periodic control messages from each of the multiple child nodes, causing the parent node transceiver to listen for periodic sensor data messages from each of the child nodes, storing in the storage device an indication of the sensor data state of each of the child nodes based upon sensor data state information included in the periodic control message received from the each of child nodes; causing a second transceiver of each child node to send a periodic control message to the parent node transceiver and to send a periodic sensor data message to the parent node transceiver, and causing the second transceiver of each child node to include an indication of sensor data state of a sensor of the child node.

In Example 37, the subject matter of Example 36 optionally includes storing in a storage device the indication of the sensor data state of each of the child nodes in a bit mask format.

In Example 38, the subject matter of any one or more of Examples 36-37 optionally include storing in the storage device the indication of the sensor data state of each of the child nodes in a Bloom filter bit mask format.

Example 39 is a method to aggregate sensor data messages in a wireless sensor network comprising: causing a transceiver of a third node to send to a transceiver of a second node sensor data, produced by a sensor of the third node, during one or more time slots associated with the third node; causing a transceiver of the second node to receive sensor data messages transmitted from the transceivers of one or more of the third nodes, storing sensor data received within the received sensor data messages in the storage device, tracking elapsed time from receipt of each received sensor data to identify stored sensor data for which elapsed time from receipt reaches a delay threshold, and sending the identified stored sensor data together with stored sensor data received after receipt of the identified stored sensor data to the transceiver of the parent node.

In Example 40, the subject matter of Example 39 optionally includes flushing from the storage device the identified stored sensor data the stored sensor data received after receipt of the identified stored sensor data.

In Example 41, the subject matter of any one or more of Examples 39-40 optionally include wherein the MCU of the second node to tracking remaining storage capacity of the storage device to determine whether the remaining storage capacity falls to a remaining storage threshold, and sending the stored sensor data to the transceiver of the parent node response to the remaining storage capacity reaching the storage threshold.

Example 42 is a method of reporting sensor data in a wireless sensor network comprising: a parent node that includes a parent node transceiver; and selectably causing only one of the parent node type of sensor and the second type of sensor to be operative at a parent node sensor node, receiving sensor at the parent node sensor node data produced by the operative one of the first type of sensor and the second type of sensor, in response to receiving sensor data, assembling a sensor data message that includes sensor data payload corresponding only to the operative one of the first type of sensor and the second type of sensor, and causing a transceiver to send the assembled message to a second sensor node.

In Example 43, the subject matter of Example 42 optionally includes wherein assembling the sensor data message includes providing in the sensor data message a sensor type identifier that identifies the selected one of the first type of sensor and second type of sensor.

Example 44 is a system to skip periodic sensor data messages in a wireless sensor network comprising: means for causing a transceiver in a parent node to listen for periodic control messages, means for causing the transceiver to listen for periodic sensor data messages, and means for determining whether to cause the parent node transceiver to skip listening for a periodic sensor data message during a sensor data time period based upon a skip indicator included in a periodic control message.

In Example 45, the subject matter of Example 44 optionally includes means for causing a child node transceiver in a second node to send the periodic control messages to the node transceiver and to send the periodic sensor data messages to the node transceiver.

In Example 46, the subject matter of any one or more of Examples 44-45 optionally include means for determining whether to skip listening for a periodic sensor data message during a sensor data time period based upon second transceiver sleep time interval information provided in a skip indicator included in the periodic control message.

In Example 47, the subject matter of any one or more of Examples 44-46 optionally include means for determining whether to skip listening for a periodic sensor data message during a sensor data time period based upon information indicating whether the sensor has data to be sent provided in a skip indicator included in the periodic control message.

In Example 48, the subject matter of any one or more of Examples 44-47 optionally include means for determining whether to skip listening for a periodic sensor data message during a sensor data time period based upon sensor data state information provided in a skip indicator included in the periodic control message.

In Example 49, the subject matter of any one or more of Examples 44-48 optionally include means for causing a second transceiver in a second node to send the periodic control messages to the parent node transceiver and to send the periodic sensor data messages to the parent node transceiver, and means for causing the second transceiver to include the skip indicator in the periodic control messages to provide an indication of whether sensor has data to be sent.

In Example 50, the subject matter of any one or more of Examples 44-49 optionally include means for causing a second transceiver in a second node to send the periodic control messages to the parent node transceiver and to send the periodic sensor data messages to the parent node transceiver, means for causing the second transceiver to include the skip indicator in the periodic control messages to provide an indication of whether sensor data state for the sensor has data to be sent, and means for causing the second transceiver to skip sending a periodic sensor data message following a control message that includes a skip indicator that indicates that a sensor of a second node has no data to be sent.

In Example 51, the subject matter of any one or more of Examples 44-50 optionally include means for causing a second transceiver in a second node to send the periodic control messages to the parent node transceiver and to send the periodic sensor data messages to the parent node transceiver, means for causing the second transceiver to include the skip indicator in the periodic control messages to provide an indication of whether sensor has data to be sent, means for causing the second transceiver to skip sending a periodic sensor data message following a control message that includes a skip indicator that indicates that a sensor of the second node has no data to be sent, and means for causing the second transceiver to send a periodic sensor data message following a control message that includes a skip indicator that indicates that the sensor has data to be sent.

In Example 52, the subject matter of any one or more of Examples 44-51 optionally include means for causing a second transceiver in a second node to send the periodic control messages to the parent node transceiver and to send the periodic sensor data messages to the parent node transceiver, means for determining whether a sensor on the second node has data to be sent, means for causing the second transceiver to include the skip indicator in the periodic control messages to provide an indication, based upon the determination, of whether sensor has data to be sent, means for causing the second transceiver to skip sending a periodic sensor data message following a control message that includes a skip indicator that indicates that a sensor of the second node has no data to be sent, and means for causing the second transceiver to send a periodic sensor data message following a control message that includes a skip indicator that indicates that the sensor has data to be sent.

In Example 53, the subject matter of any one or more of Examples 44-52 optionally include means for causing a second transceiver of a second node to send the periodic control messages to the parent node transceiver and to send the periodic sensor data messages to the parent node transceiver, and means for causing the second transceiver to include the skip indicator in the periodic control messages to provide an indication of a sleep time interval when the second transceiver will not transmit.

In Example 54, the subject matter of any one or more of Examples 44-53 optionally include means for causing a second transceiver of a second node to send the periodic control messages to the parent node transceiver and to send the periodic sensor data messages to the parent node transceiver, means for causing the second transceiver to include the skip indicator in the periodic control messages to provide an indication of a sleep time interval when the second transceiver will not transmit, and means for causing the second transceiver to sleep during the sleep time interval.

In Example 55, the subject matter of any one or more of Examples 44-54 optionally include means for causing a second transceiver of a second node to send the periodic control messages to the parent node transceiver and to send the periodic sensor data messages to the parent node transceiver, means for determining whether to cause the second transceiver to sleep, means for causing the second transceiver to send the periodic control messages to the parent node transceiver and to send the periodic sensor data messages to the parent node transceiver, means for causing the second transceiver to include the skip indicator in the periodic control messages to provide an indication of a sleep time interval when the second transceiver will not transmit, and means for causing the second transceiver to sleep during the sleep time interval.

Example 56 is a system to skip periodic sensor data messages in a wireless sensor network comprising: means for causing a parent node transceiver of a parent node to listen for periodic control messages from each of the multiple child nodes, means for causing the parent node transceiver to listen for periodic sensor data messages from each of the child nodes, means for determining whether to skip listening for periodic sensor data messages from one or more of the child nodes during one or more sensor data message time periods allocated to the one or more child nodes based upon skip indicators indicating sensor data state of sensors of the one or more child nodes that are included in the periodic control message received from the one or more child nodes.

Example 57 is a system to skip periodic sensor data messages in a wireless sensor network comprising: means for causing a parent node transceiver of a parent node to listen for periodic control messages from each of the multiple child nodes, means for causing the parent node transceiver to listen for periodic sensor data messages from each of the child nodes, means for storing in the storage device an indication of the sensor data state of each of the child nodes based upon sensor data state information included in the periodic control message received from the each of child nodes; means for causing a second transceiver of each child node to send a periodic control message to the parent node transceiver and to send a periodic sensor data message to the parent node transceiver, and means for causing the second transceiver of each child node to include an indication of sensor data state of a sensor of the child node.

In Example 58, the subject matter of Example 57 optionally includes means for storing in a storage device the indication of the sensor data state of each of the child nodes in a bit mask format.

In Example 59, the subject matter of any one or more of Examples 57-58 optionally include means for storing in the storage device the indication of the sensor data state of each of the child nodes in a Bloom filter bit mask format.

Example 60 is a system to aggregate sensor data messages in a wireless sensor network comprising: means for causing a transceiver of a third node to send to a transceiver of a second node sensor data, produced by a sensor of the third node, during one or more time slots associated with the third node; means for causing a transceiver of the second node to receive sensor data messages transmitted from the transceivers of one or more of the third nodes, means for storing sensor data received within the received sensor data messages in the storage device, means for tracking elapsed time from receipt of each received sensor data to identify stored sensor data for which elapsed time from receipt reaches a delay threshold, and means for sending the identified stored sensor data together with stored sensor data received after receipt of the identified stored sensor data to the transceiver of the parent node.

In Example 61, the subject matter of Example 60 optionally includes means for flushing from the storage device the identified stored sensor data the stored sensor data received after receipt of the identified stored sensor data.

In Example 62, the subject matter of any one or more of Examples 60-61 optionally include means for tracking remaining storage capacity of the storage device to determine whether the remaining storage capacity falls to a remaining storage threshold, and means for sending the stored sensor data to the transceiver of the parent node in response to the remaining storage capacity reaching the storage threshold.

Example 63 is a system of reporting sensor data in a wireless sensor network comprising: a parent node that includes a parent node transceiver; and means for selectably causing only one of the parent node type of sensor and the second type of sensor to be operative at a parent node sensor node, means for receiving sensor at the parent node sensor node data produced by the operative one of the first type of sensor and the second type of sensor, means for in response to receiving sensor data, assembling a sensor data message that includes sensor data payload corresponding only to the operative one of the first type of sensor and the second type of sensor, and means for causing a transceiver to send the assembled message to a second sensor node.

In Example 64, the subject matter of Example 63 optionally includes wherein assembling the sensor data message includes providing in the sensor data message a sensor type identifier that identifies the selected one of the first type of sensor and second type of sensor.

Example 65 is an article of manufacture that includes a storage device that includes information to cause a microcontroller unit of a node in a wireless sensor network to perform a method comprising: causing a transceiver in a parent node to listen for periodic control messages, causing the transceiver to listen for periodic sensor data messages, and determining whether to cause the parent node transceiver to skip listening for a periodic sensor data message during a sensor data time period based upon a skip indicator included in a periodic control message.

In Example 66, the subject matter of Example 65 optionally includes causing a child node transceiver in a second node to send the periodic control messages to the node transceiver and to send the periodic sensor data messages to the node transceiver.

In Example 67, the subject matter of any one or more of Examples 65-66 optionally include determining whether to skip listening for a periodic sensor data message during a sensor data time period based upon second transceiver sleep time interval information provided in a skip indicator included in the periodic control message.

In Example 68, the subject matter of any one or more of Examples 65-67 optionally include determining whether to skip listening for a periodic sensor data message during a sensor data time period based upon information indicating whether the sensor has data to be sent provided in a skip indicator included in the periodic control message.

In Example 69, the subject matter of any one or more of Examples 65-68 optionally include determining whether to skip listening for a periodic sensor data message during a sensor data time period based upon sensor data state information provided in a skip indicator included in the periodic control message.

In Example 70, the subject matter of any one or more of Examples 65-69 optionally include causing a second transceiver in a second node to send the periodic control messages to the parent node transceiver and to send the periodic sensor data messages to the parent node transceiver, and causing the second transceiver to include the skip indicator in the periodic control messages to provide an indication of whether sensor has data to be sent.

In Example 71, the subject matter of any one or more of Examples 65-70 optionally include causing a second transceiver in a second node to send the periodic control messages to the parent node transceiver and to send the periodic sensor data messages to the parent node transceiver, causing the second transceiver to include the skip indicator in the periodic control messages to provide an indication of whether sensor data state for the sensor has data to be sent, and causing the second transceiver to skip sending a periodic sensor data message following a control message that includes a skip indicator that indicates that a sensor of a second node has no data to be sent.

In Example 72, the subject matter of any one or more of Examples 65-71 optionally include causing a second transceiver in a second node to send the periodic control messages to the parent node transceiver and to send the periodic sensor data messages to the parent node transceiver, causing the second transceiver to include the skip indicator in the periodic control messages to provide an indication of whether sensor has data to be sent, causing the second transceiver to skip sending a periodic sensor data message following a control message that includes a skip indicator that indicates that a sensor of the second node has no data to be sent, and causing the second transceiver to send a periodic sensor data message following a control message that includes a skip indicator that indicates that the sensor has data to be sent.

In Example 73, the subject matter of any one or more of Examples 65-72 optionally include causing a second transceiver in a second node to send the periodic control messages to the parent node transceiver and to send the periodic sensor data messages to the parent node transceiver, determining whether a sensor on the second node has data to be sent, causing the second transceiver to include the skip indicator in the periodic control messages to provide an indication, based upon the determination, of whether sensor has data to be sent, and causing the second transceiver to skip sending a periodic sensor data message following a control message that includes a skip indicator that indicates that a sensor of the second node has no data to be sent, and causing the second transceiver to send a periodic sensor data message following a control message that includes a skip indicator that indicates that the sensor has data to be sent.

In Example 74, the subject matter of any one or more of Examples 65-73 optionally include causing a second transceiver of a second node to send the periodic control messages to the parent node transceiver and to send the periodic sensor data messages to the parent node transceiver, and causing the second transceiver to include the skip indicator in the periodic control messages to provide an indication of a sleep time interval when the second transceiver will not transmit.

In Example 75, the subject matter of any one or more of Examples 65-74 optionally include causing a second transceiver of a second node to send the periodic control messages to the parent node transceiver and to send the periodic sensor data messages to the parent node transceiver, causing the second transceiver to include the skip indicator in the periodic control messages to provide an indication of a sleep time interval when the second transceiver will not transmit, and causing the second transceiver to sleep during the sleep time interval.

In Example 76, the subject matter of any one or more of Examples 65-75 optionally include causing a second transceiver of a second node to send the periodic control messages to the parent node transceiver and to send the periodic sensor data messages to the parent node transceiver, determining whether to cause the second transceiver to sleep, causing the second transceiver to send the periodic control messages to the parent node transceiver and to send the periodic sensor data messages to the parent node transceiver, causing the second transceiver to include the skip indicator in the periodic control messages to provide an indication of a sleep time interval when the second transceiver will not transmit, and causing the second transceiver to sleep during the sleep time interval.

Example 77 is an article of manufacture that includes a storage device that includes information to cause a microcontroller unit of a node in a wireless sensor network to perform a method comprising: causing a parent node transceiver of a parent node to listen for periodic control messages from each of the multiple child nodes, causing the parent node transceiver to listen for periodic sensor data messages from each of the child nodes, determining whether to skip listening for periodic sensor data messages from one or more of the child nodes during one or more sensor data message time periods allocated to the one or more child nodes based upon skip indicators indicating sensor data state of sensors of the one or more child nodes that are included in the periodic control message received from the one or more child nodes.

Example 78 is an article of manufacture that includes a storage device that includes information to cause a microcontroller unit of a node in a wireless sensor network to perform a method comprising: causing a parent node transceiver of a parent node to listen for periodic control messages from each of the multiple child nodes, causing the parent node transceiver to listen for periodic sensor data messages from each of the child nodes, storing in the storage device an indication of the sensor data state of each of the child nodes based upon sensor data state information included in the periodic control message received from the each of child nodes; causing a second transceiver of each child node to send a periodic control message to the parent node transceiver and to send a periodic sensor data message to the parent node transceiver, and causing the second transceiver of each child node to include an indication of sensor data state of a sensor of the child node.

In Example 79, the subject matter of Example 78 optionally includes storing in a storage device the indication of the sensor data state of each of the child nodes in a bit mask format.

In Example 80, the subject matter of any one or more of Examples 78-79 optionally include storing in the storage device the indication of the sensor data state of each of the child nodes in a Bloom filter bit mask format.

Example 81 is an article of manufacture that includes a storage device that includes information to cause a microcontroller unit of a node in a wireless sensor network to perform a method comprising: causing a transceiver of a third node to send to a transceiver of a second node sensor data, produced by a sensor of the third node, during one or more time slots associated with the third node; causing a transceiver of the second node to receive sensor data messages transmitted from the transceivers of one or more of the third nodes, storing sensor data received within the received sensor data messages in the storage device, tracking elapsed time from receipt of each received sensor data to identify stored sensor data for which elapsed time from receipt reaches a delay threshold, and sending the identified stored sensor data together with stored sensor data received after receipt of the identified stored sensor data to the transceiver of the parent node.

In Example 82, the subject matter of Example 81 optionally includes flushing from the storage device the identified stored sensor data the stored sensor data received after receipt of the identified stored sensor data.

In Example 83, the subject matter of any one or more of Examples 81-82 optionally include wherein the MCU of the second node to tracking remaining storage capacity of the storage device to determine whether the remaining storage capacity falls to a remaining storage threshold, and sending the stored sensor data to the transceiver of the parent node in response to the remaining storage capacity reaching the storage threshold.

Example 84 is an article of manufacture that includes a storage device that includes information to cause a microcontroller unit of a node in a wireless sensor network to perform a method comprising: a parent node that includes a parent node transceiver; and selectably causing only one of the parent node type of sensor and the second type of sensor to be operative at a parent node sensor node, receiving sensor at the parent node sensor node data produced by the operative one of the first type of sensor and the second type of sensor, in response to receiving sensor data, assembling a sensor data message that includes sensor data payload corresponding only to the operative one of the first type of sensor and the second type of sensor, and causing a transceiver to send the assembled message to a second sensor node.

In Example 85, the subject matter of Example 84 optionally includes wherein assembling the sensor data message includes providing in the sensor data message a sensor type identifier that identifies the selected one of the first type of sensor and second type of sensor.

Example 86 is at least one machine-readable medium including instructions, which when executed by a machine, cause the machine to perform operations of any of the methods of Examples 23-43.

Example 87 is an apparatus comprising means for performing any of the methods of Examples 23-43.

Example 88 is at least one machine-readable medium including instructions, which when executed by a machine, cause the machine to perform operations of any of the operations of Examples 1-85.

Example 89 is an apparatus comprising means for performing any of the operations of Examples 1-85.

Example 90 is a system to perform the operations of any of the Examples 1-85.

Example 91 is a method to perform the operations of any of the Examples 1-85.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. A wireless sensor network comprising:
   a node comprising:
      a node transceiver configured to listen for:
         periodic control messages; and
         periodic sensor data messages; and
      a node microcontroller unit (MCU) configured to:
         read a periodic control message frons a child node;
         compare child node sensor data state information in the periodic control message to child node sensor data state information in an earlier-received periodic control message from the child node;
         in response to the child node sensor data state information in the periodic control message being identical to the child node sensor data state information in the earlier-received periodic control message, determine that a skip indicator is positive and cause the transceiver to skip listening for a periodic sensor data message from the child node during a sensor data time period based upon the skip indicator being positive; and
         in response to the child node sensor data state information in the periodic control message being different from the child node sensor data state information in the earlier-received periodic control message, determine that the skip indicator is negative and cause the transceiver to listen for the periodic sensor data message from the child node during the sensor data time period based upon the skip indicator being negative.

2. The wireless sensor network of claim 1 wherein:
   the child node includes a child transceiver, a child sensor, and a child MCU; and
   the child MCU is configured to cause the child node transceiver to send the periodic control messages to the node transceiver and to send the periodic sensor data messages to the node transceiver.

3. The wireless sensor network of claim 1, wherein the node MCU is configured to:
   determine whether to skip listening for the periodic sensor data message during the sensor data time period based upon child transceiver sleep time interval information provided in the skip indicator included in the periodic control message.

4. The wireless sensor network of claim 1 wherein:
the child node includes a child transceiver, a child sensor, and a child MCU; and the child MCU is configured to:
cause the child transceiver to send the periodic control messages to the node transceiver and to send the periodic sensor data messages to the node transceiver, and
cause the child transceiver to include the skip indicator in the periodic control messages to provide an indication of whether the child sensor has data to be sent.

5. The wireless sensor network of claim 1 wherein:
the child node includes a child transceiver, a child sensor, and a child MCU; and
the child MCU is configured to:
cause the child transceiver to send the periodic control messages to the node transceiver and to send the periodic sensor data messages to the node transceiver,
cause the child transceiver to include the skip indicator in the periodic control messages to provide an indication of whether the child sensor has data to be sent,
cause the child transceiver to skip sending a particular periodic sensor data message following a particular control message that includes a skip indicator that indicates that the child sensor has no data to be sent, and
cause the child transceiver to send another particular periodic sensor data message following another particular control message that includes a skip indicator that indicates that the child sensor has data to be sent.

6. A method to skip periodic sensor data messages in a wireless sensor network, comprising:
causing a parent node transceiver in a parent node to listen for a periodic control message from a child node;
comparing child node sensor data state information in the periodic control message to child node sensor data state information in an earlier-received periodic control message from the child node;
in response to the child node sensor data state information in the periodic control message being identical to the child node sensor data state information in the earlier-received periodic control message, determining that a skip indicator is positive and causing the parent node transceiver to skip listening for a periodic sensor data message from the child node during a sensor data time period based upon the skip indicator being positive; and
in response to the child node sensor data state information in the periodic control message being different from the child node sensor data state information in the earlier-received periodic control message, determining that the skip indicator is negative and causing the parent node transceiver to listen for the periodic sensor data message from the child node during the sensor data time period based upon the skip indicator being negative.

7. The method of claim 6, wherein:
determining whether to skip listening for the periodic sensor data message during the sensor data time period is based upon child transceiver sleep time interval information provided in the skip indicator included in the periodic control message.

8. The method of claim 6, further comprising:
causing a child transceiver in the child node to send the periodic control messages to the parent node transceiver and to send the periodic sensor data messages to the parent node transceiver, and
causing the child transceiver to include the skip indicator in the periodic control messages to provide an indication of whether a child sensor has data to be sent.

9. The method of claim 6, further comprising:
causing a child transceiver in the child node to send the periodic control messages to the parent node transceiver and to send the periodic sensor data messages to the parent node transceiver,
causing the child transceiver to include the skip indicator in the periodic control messages to provide an indication of whether a child sensor has data to be sent,
causing the child transceiver to skip sending a particular periodic sensor data message following a particular control message that includes a skip indicator that indicates that the child sensor has no data to be sent, and
causing the child transceiver to send another particular periodic sensor data message following another particular control message that includes a skip indicator that indicates that the sensor has data to be sent.

10. At least one non-transitory machine-readable storage medium including instructions, wherein the instructions, when executed by a microcontroller unit of a node in a wireless sensor network, perform operations comprising:
causing a parent node transceiver in a parent node to listen for a periodic control message from a child node;
comparing child node sensor data state information in the periodic control message to child node sensor data state information in an earlier-received periodic control message from the child node;
in response to the child node sensor data state information in the periodic control message being identical to the child node sensor data state information in the earlier-received periodic control message, determining that a skip indicator is positive and causing the parent node transceiver to skip listening for a periodic sensor data message from the child node during a sensor data time period based upon the skip indicator being positive; and
in response to the child node sensor data state information in the periodic control message being different from the child node sensor data state information in the earlier-received periodic control message, determining that the skip indicator is negative and causing the parent node transceiver to listen for the periodic sensor data message from the child node during the sensor data time period based upon the skip indicator being negative.

11. The machine-readable storage medium of claim 10, wherein:
determining whether to skip listening for the periodic sensor data message during the sensor data time period is based upon child transceiver sleep time interval information provided in the skip indicator included in the periodic control message.

12. The machine-readable storage medium of claim 10, the operations further comprising:
causing a child transceiver in the child node to send the periodic control messages to the parent node transceiver and to send the periodic sensor data messages to the parent node transceiver, and
causing the child transceiver to include the skip indicator in the periodic control messages to provide an indication of whether a child sensor has data to be sent.

13. The machine-readable storage medium of claim 10, the operations further comprising:
causing a child transceiver in the child node to send the periodic control messages to the parent node transceiver and to send the periodic sensor data messages to the parent node transceiver, causing the child transceiver to include the skip indicator in the periodic control messages to provide an indication of whether a child sensor has data to be sent, causing the child transceiver to skip sending a particular periodic sensor data message following a particular control message that includes a skip indicator that indicates that the child sensor has no data to be sent, and causing the child transceiver to send another particular periodic sensor data message following another particular control message that includes a skip indicator that indicates that the sensor has data to be sent.

14. The wireless sensor network of claim 1, wherein:
the child node sensor state information in the periodic control message is different from the child node sensor data state information in the earlier-received periodic control message when any dependent node of the node has sensor data to report, and
dependent nodes of the node include multiple generations of child nodes from the node.

15. The wireless sensor network of claim 14, wherein:
sensor data from lower generation child nodes is aggregated to a parent node of the lower generation child nodes to form each periodic sensor data message to a further parent node of the parent node.

16. The wireless sensor network of claim 14, wherein:
sensor data from child nodes of the child node is aggregated to form the periodic sensor data message.

17. The wireless sensor network of claim 1, wherein:
sensor data from child nodes is aggregated to a parent node of the child nodes to form a particular periodic sensor data message, and
at least one of a bit map or Bloom filter is used to condense sensor state information of the child nodes to pinpoint which sensors in the child nodes have sensor data to report.

18. The wireless sensor network of claim 17, wherein:
each hit in the bit map represents a change in a sensor state for one of the child nodes.

19. The wireless sensor network of claim 17, wherein:
the Bloom filter is used as a bitmask with different hash functions for each bit in the bitmask.

20. The wireless sensor network of claim 1, wherein:
a periodicity of the periodic sensor data message is dependent on a memory capacity of the node MCU.

21. The wireless sensor network of claim 1, wherein:
the node MCU is configured to sleep during shared slots only when each child node indicates, in a respective periodic control message from the child node, that the child node will go into a sleep mode for a specified sleep time period.

22. The wireless sensor network of claim 1, wherein:
the periodic sensor data message is a configurable message comprising a key-value pair.

23. The wireless sensor network of claim 22, wherein:
the node transceiver is configured to dynamically configure child nodes to report different related information at different offsets.

* * * * *

UNITED STATES PATENT AND TRADEMARK OFFICE
CERTIFICATE OF CORRECTION

PATENT NO. : 11,246,094 B2
APPLICATION NO. : 16/461724
DATED : February 8, 2022
INVENTOR(S) : Agerstam et al.

Page 1 of 1

It is certified that error appears in the above-identified patent and that said Letters Patent is hereby corrected as shown below:

In the Claims

In Column 30, Line 31, in Claim 1, delete "frons" and insert --from-- therefor

In Column 34, Line 9, in Claim 18, delete "hit" and insert --bit-- therefor

Signed and Sealed this
Nineteenth Day of April, 2022

Katherine Kelly Vidal
*Director of the United States Patent and Trademark Office*